June 21, 1949. S. F. MONTAGUE 2,473,720
APPARATUS FOR FORMING WOODEN SPOONS FROM BLANKS
Filed Sept. 17, 1943 13 Sheets-Sheet 1
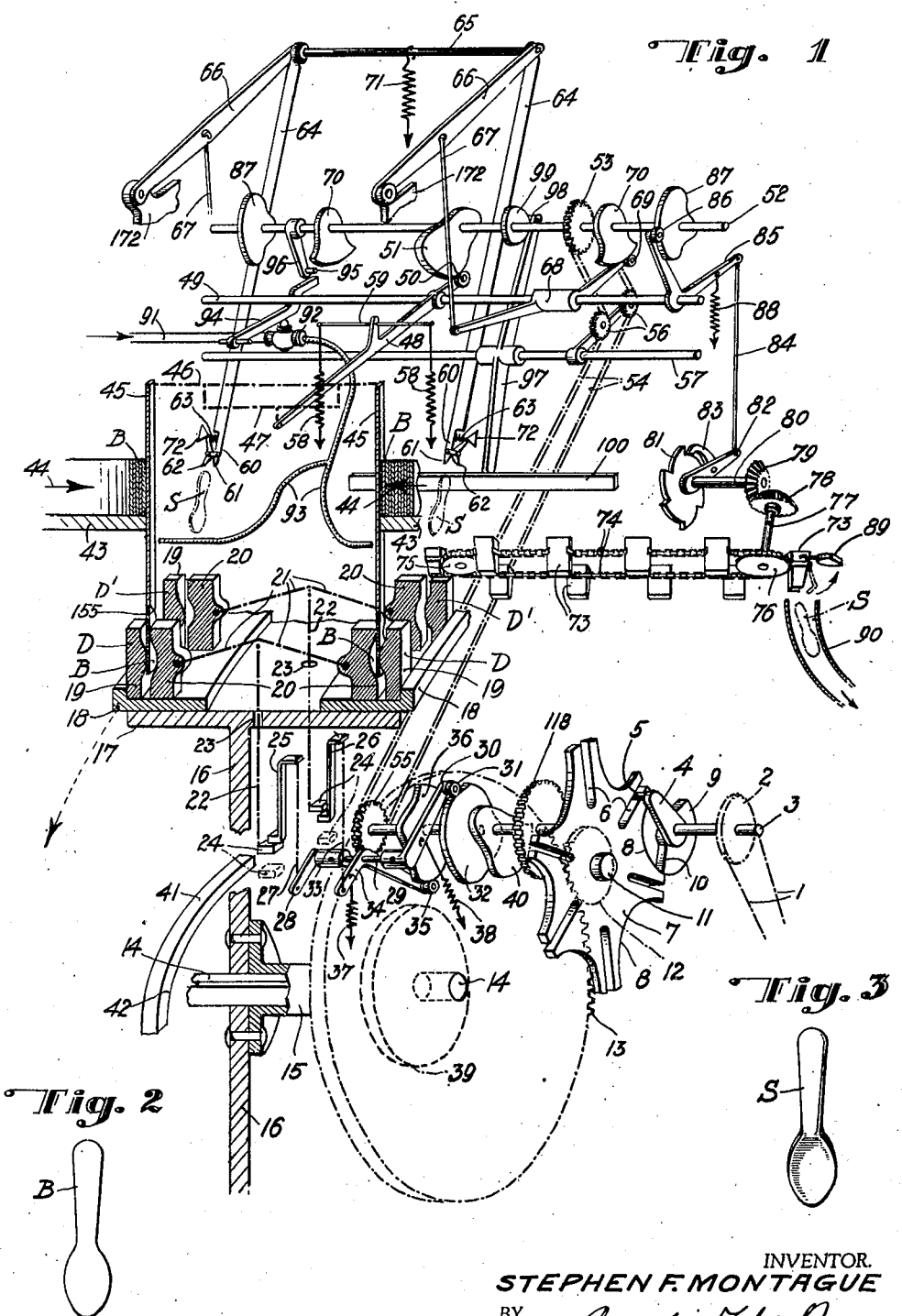
INVENTOR.
STEPHEN F. MONTAGUE
BY Cornelius Zabriskie
ATTORNEY.

June 21, 1949.　　　S. F. MONTAGUE　　　2,473,720
APPARATUS FOR FORMING WOODEN SPOONS FROM BLANKS
Filed Sept. 17, 1943　　　　　　　　　　13 Sheets-Sheet 4

INVENTOR.
STEPHEN F. MONTAGUE
BY
ATTORNEY.

June 21, 1949.  S. F. MONTAGUE  2,473,720
APPARATUS FOR FORMING WOODEN SPOONS FROM BLANKS
Filed Sept. 17, 1943  13 Sheets-Sheet 5

INVENTOR.
STEPHEN F. MONTAGUE
BY Cornelius Zaluska
ATTORNEY.

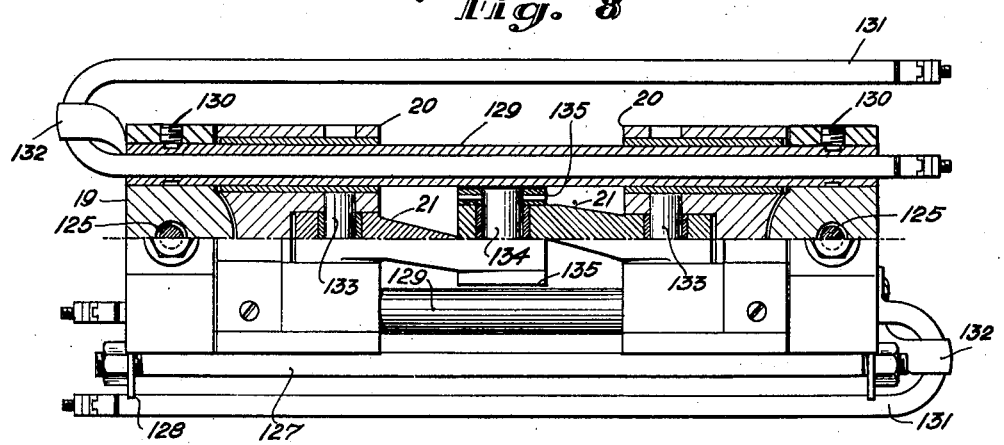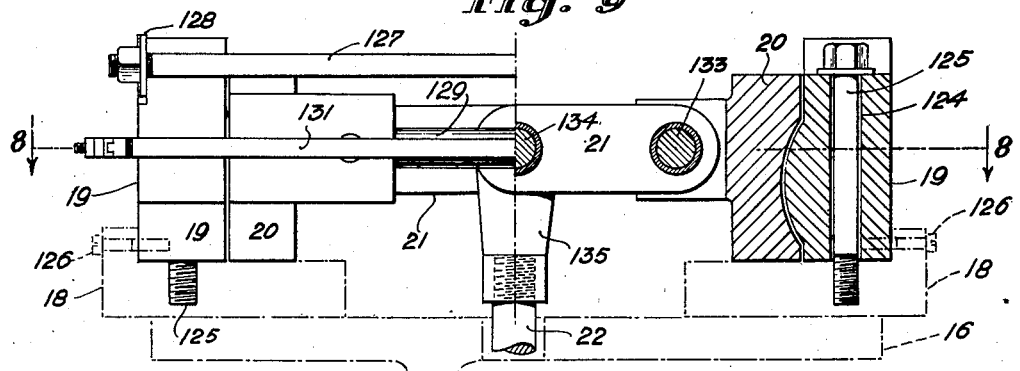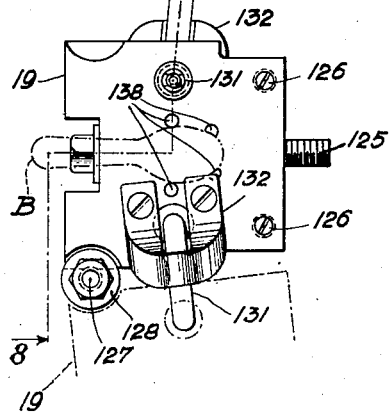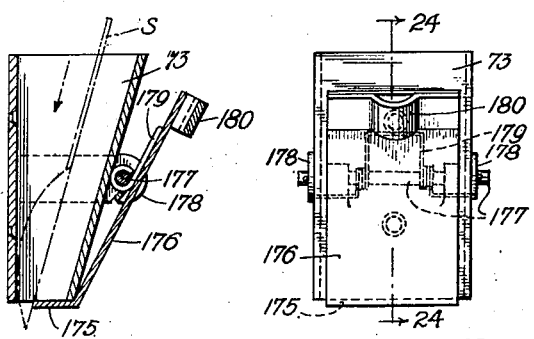

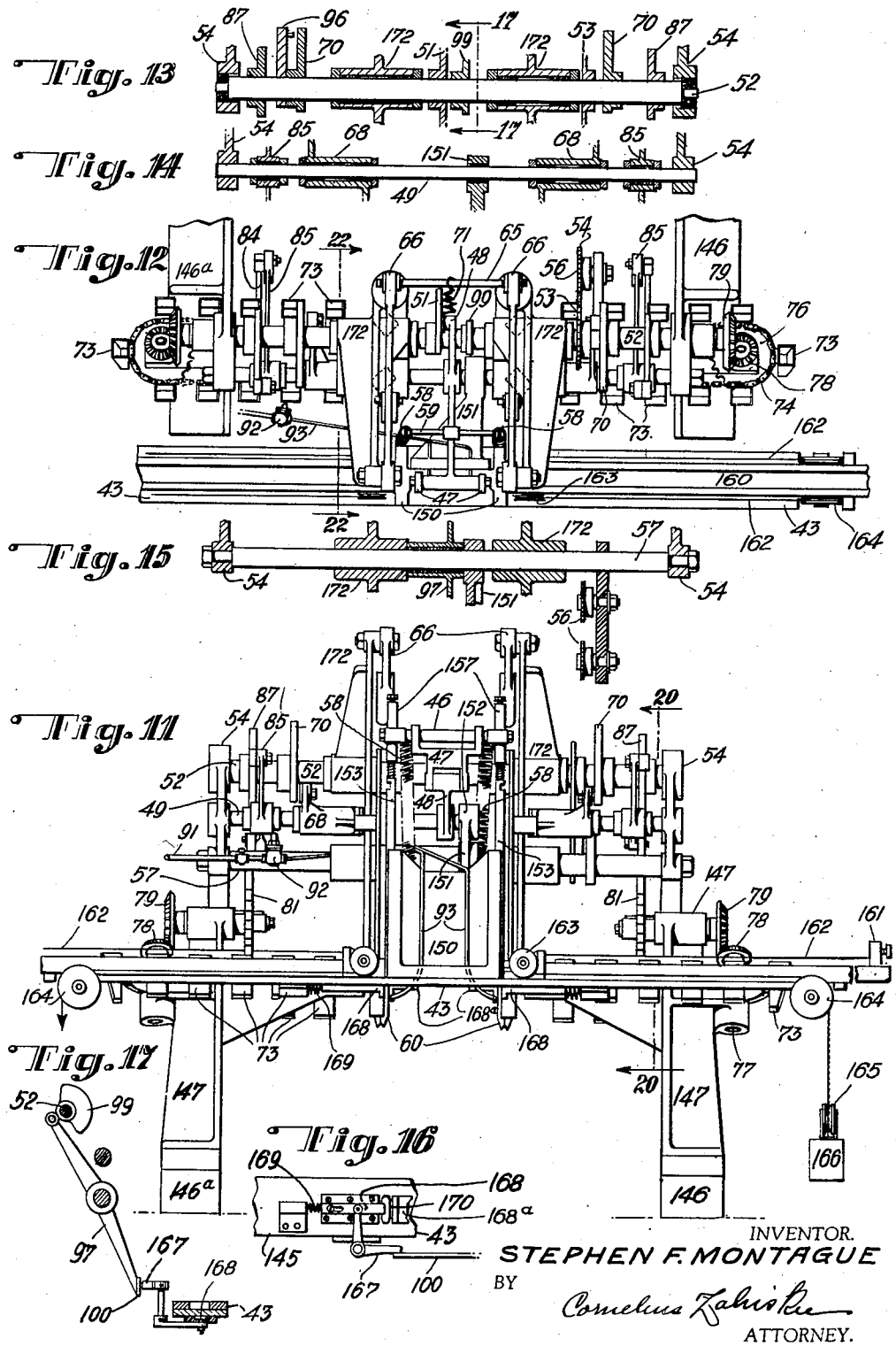

June 21, 1949.  S. F. MONTAGUE  2,473,720
APPARATUS FOR FORMING WOODEN SPOONS FROM BLANKS
Filed Sept. 17, 1943  13 Sheets-Sheet 8
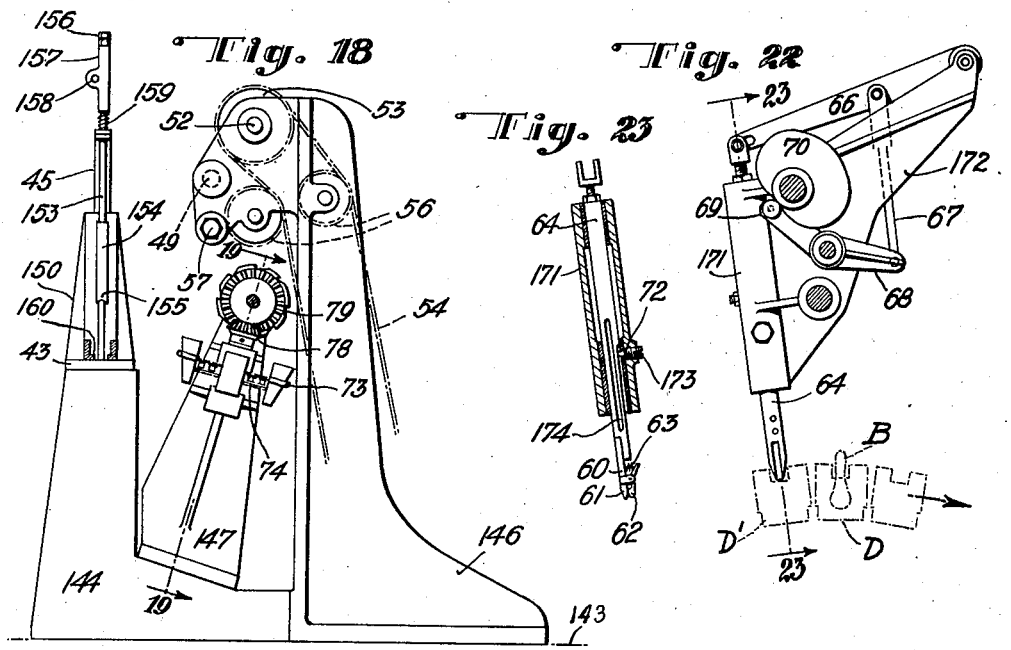
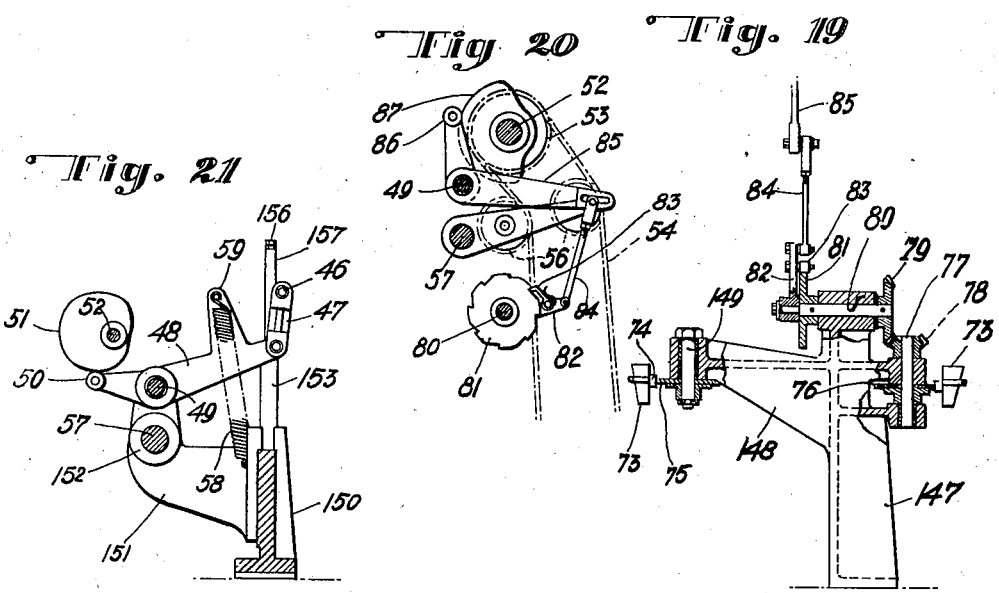
INVENTOR.
STEPHEN F. MONTAGUE
BY
Cornelius Falvioske
ATTORNEY.

June 21, 1949. S. F. MONTAGUE 2,473,720
APPARATUS FOR FORMING WOODEN SPOONS FROM BLANKS
Filed Sept. 17, 1943. 13 Sheets-Sheet 11

INVENTOR.
STEPHEN F. MONTAGUE
BY Cornelius Zabriskie
ATTORNEY

June 21, 1949.  S. F. MONTAGUE  2,473,720
APPARATUS FOR FORMING WOODEN SPOONS FROM BLANKS
Filed Sept. 17, 1943  13 Sheets—Sheet 12
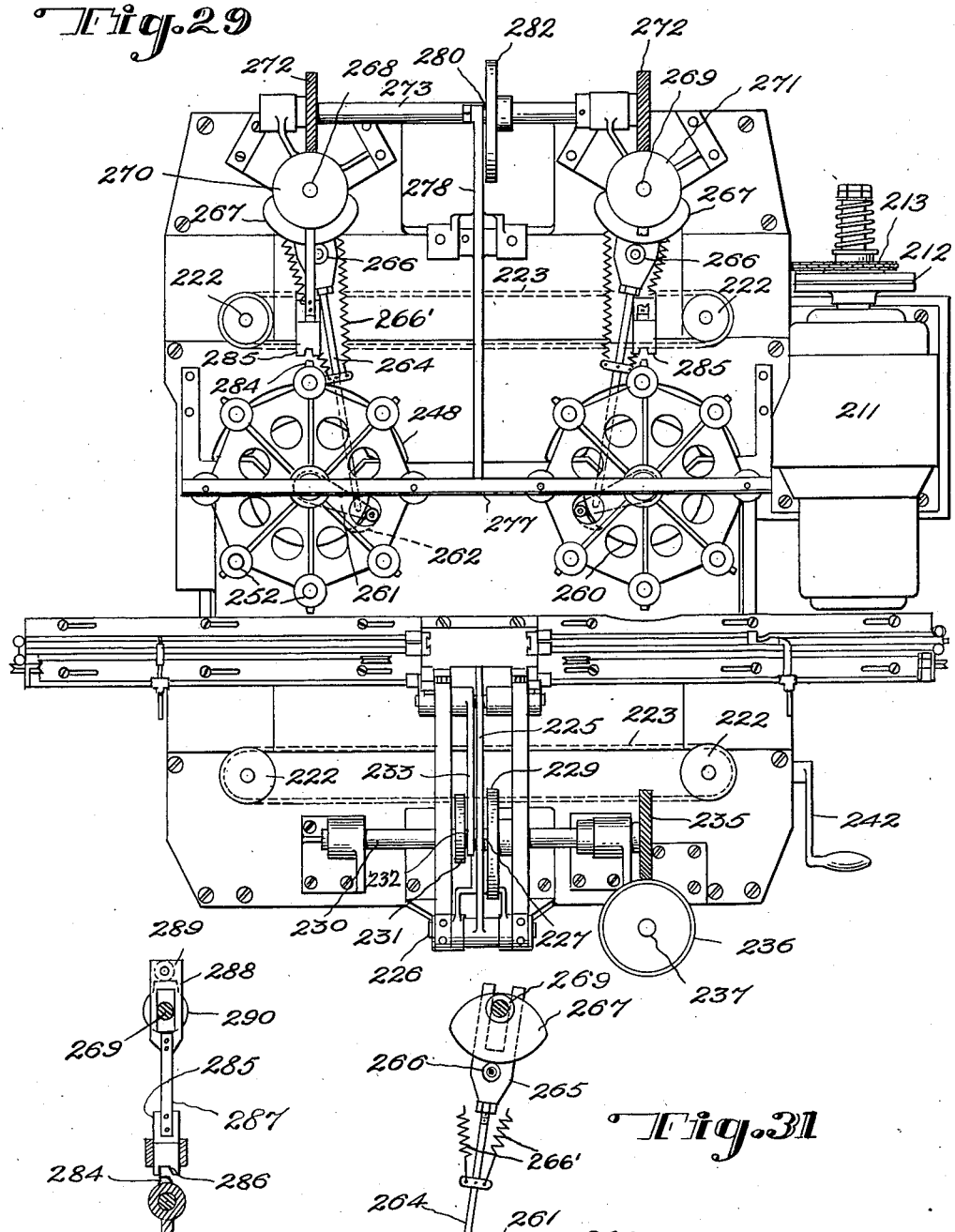
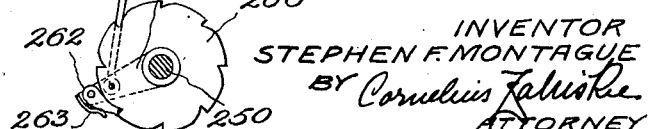
INVENTOR
STEPHEN F. MONTAGUE
BY Cornelius Falvie
ATTORNEY June 21, 1949. S. F. MONTAGUE 2,473,720
APPARATUS FOR FORMING WOODEN SPOONS FROM BLANKS
Filed Sept. 17, 1943 13 Sheets-Sheet 13
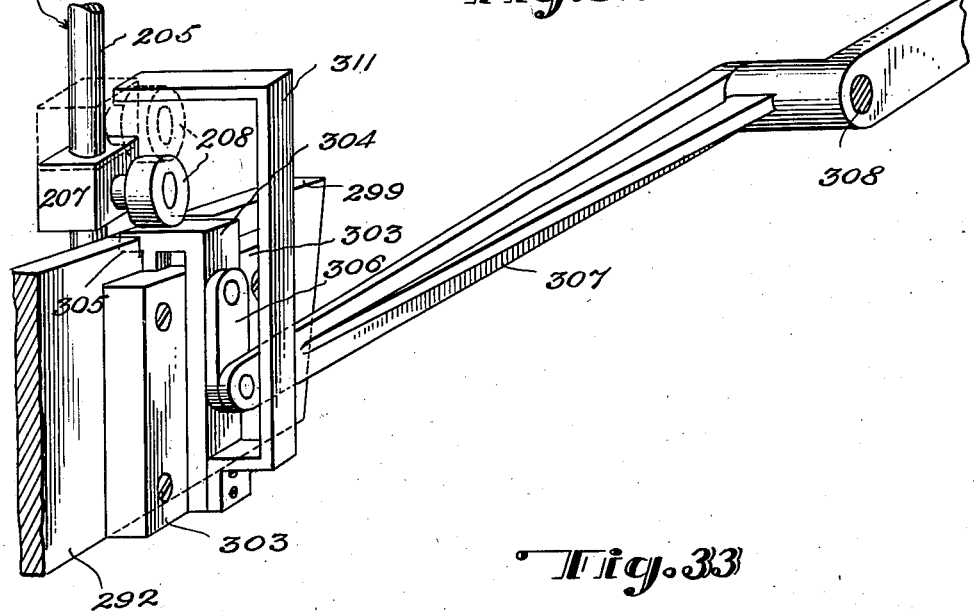
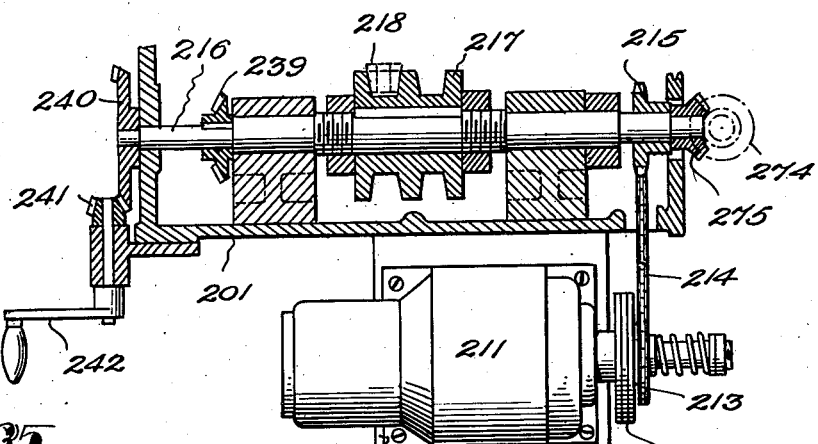
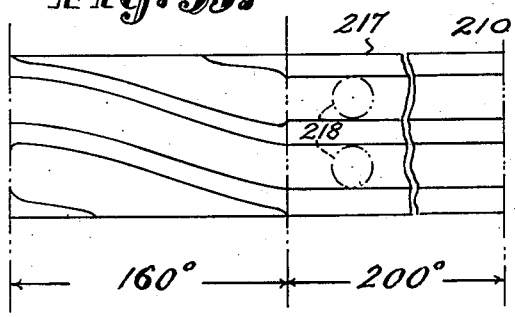
INVENTOR
STEPHEN F. MONTAGUE
BY Cornelius Zabriskie
ATTORNEY Patented June 21, 1949

2,473,720

UNITED STATES PATENT OFFICE 2,473,720

APPARATUS FOR FORMING WOODEN SPOONS FROM BLANKS

Stephen F. Montague, Oswego, N. Y., assignor, by mesne assignments, to The Diamond Match Company, New York, N. Y., a corporation of Delaware Application September 17, 1943, Serial No. 502,744

15 Claims. (Cl. 144—2)

This application is a continuation-in-part of my prior application, Serial No. 307,954, filed December 7, 1939, now issued as Patent No. 2,346,039, dated April 4, 1944. In such prior application I disclose a method of and certain apparatus for forming wooden spoons from blanks, and claim such method. The present application is directed to various forms of apparatus whereby such method may be commercially practised in the manufacture of wooden articles from blanks, primarily spoons from wood veneer blanks, in an economical and efficient manner.

The primary object of the invention is to provide the means for cheaply producing wood veneer spoons having a hollow bowl adapted to satisfactorily contain and retain therein solid, liquid or semi-liquid materials and so shaped throughout as to impart appreciable structural strength to the article while permitting the use of relatively thin wood stock.

In certain of its preferred embodiments, the apparatus employed comprises a succession of pairs of die couples arranged in closely spaced apart circumferential relation about the periphery of a drum. The companion die couples of each pair are arranged in the same radial plane and each die couple embodies two suitably heated complementary die sections. The outer die sections of each pair of couples are rigidly mounted with respect to the drum, while the inner die sections are mounted for movement toward and away from one another and are connected together by a toggle, which is adapted to be flexed by the action of appropriate cams, hereinafter more fully described. These cams are so constituted as to produce a substantially quick preliminary closing of each die for the purpose of gripping a blank therein, and to thereafter gradually progressively close such die as the drum is intermittently rotated, through the employment of properly timed mechanism, to successively bring the consecutive die couples into register with a stationary feeding station, with periods of dwell at the feeding station for each couple. In addition to the die feeding and operating means referred to, the apparatus includes means for opening the die couples at the conclusion of the spoon forming operation and for removing and conveying away the finished product to be discharged from the machine.

An important feature of the present invention resides in the capacity of the apparatus of this invention to produce a high grade finished product in a completely automatic manner and with remarkably high quantity production, all of which results in economy of manufacture and the ability to sell the product at relatively low cost.

Features of the invention, other than those adverted to, will be apparent from the hereinafter detailed description and claims, when read in conjunction with the accompanying drawings.

In the accompanying drawings, I have shown various forms of apparatus for carrying out this invention, but this apparatus is to be understood as illustrative, only, and not as defining the limits of the invention.

Figure 1 is a diagrammatic showing of one form of apparatus embodying the present invention, illustrating the parts in perspective and showing their general relation in the apparatus shown in Figures 2–25, inclusive.

Figure 2 is a face view of a spoon blank adapted to be manipulated by the machines of this invention.

Figure 3 is a face view of the finished spoon.

Figure 8 shows one die couple, partly in plan view and partly in central section on the line 8—8 of Figures 9 and 10.

Figure 9 is a front elevation of the die couple shown in Figure 8, with the right hand half of that view in substantially central vertical section, but showing both links of the toggle in elevation.

Figure 10 is an end view of the die couple shown in Figures 8 and 9, with one adjacent die couple indicated in phantom.

Figure 11 is a front elevation of the upper portion of the machine of Figures 1–25, constituting the blank feeding and removing apparatus.

Figure 12 is a plan view of the structure shown in Figure 11.

Figure 13 is a section through the upper cam shaft assembly of the machine of Figures 1–25.

Figure 14 is a section through the upper rocker shaft assembly of the machine of Figures 1–25.

Figure 15 is a section through the upper tie rod assembly of the machine of Figures 1–25.

Figure 16 is an underneath fragmentary plan view of the blank feeding plate and certain associated parts as they appear directly above this figure in Figure 11.

Figure 17 is a section in approximately the plane of the line 17—17 of Figure 13, showing the connections between the cam shaft and the parts shown in Figure 16.

Figure 18 is an end view of the upper portion of the machine of Figures 1–25, showing more particularly the end frames which support the spoon introducing and removing parts.

Figure 19 is a front elevation of a bucket conveyor and its operating mechanism, with certain parts shown in section in the plane of the line 19—19 of Figure 18.

Figure 20 is a fragmental section taken substantially in the plane of the line 20—20 of Figure 11.

Figure 21 is a fragmental vertical section taken substantially midway of the length of the machine of Figures 1–25, and through the upper portion thereof to illustrate the operating devices for imparting movement of spoon introducing plungers.

Figure 22 is a fragmental section on the line 22—22 of Figure 12.

Figure 23 is a section on the line 23—23 of Figure 22.

Figure 24 is a section on the line 24—24 of Figure 25.

Figure 25 is a front view of one bucket of a bucket conveyor shown in Figure 1.

Figure 29 is a plan view of the machine of Figures 26–28.

Figure 30 is a fragmental section taken on the line 30—30 of Figure 26.

Figure 31 is a fragmental section on the line 31—31 of Figure 26.

Figure 32 is an enlarged fragmental perspective view illustrating the manner in which the die operating toggles are controlled in the embodiment of the invention of Figures 26–33.

Figure 33 is a fragmental section on the line 33—33 of Figure 26.

Figure 34 is an elevation of a barrel cam; and.

Figure 35 is the development thereof.

Figure 4:
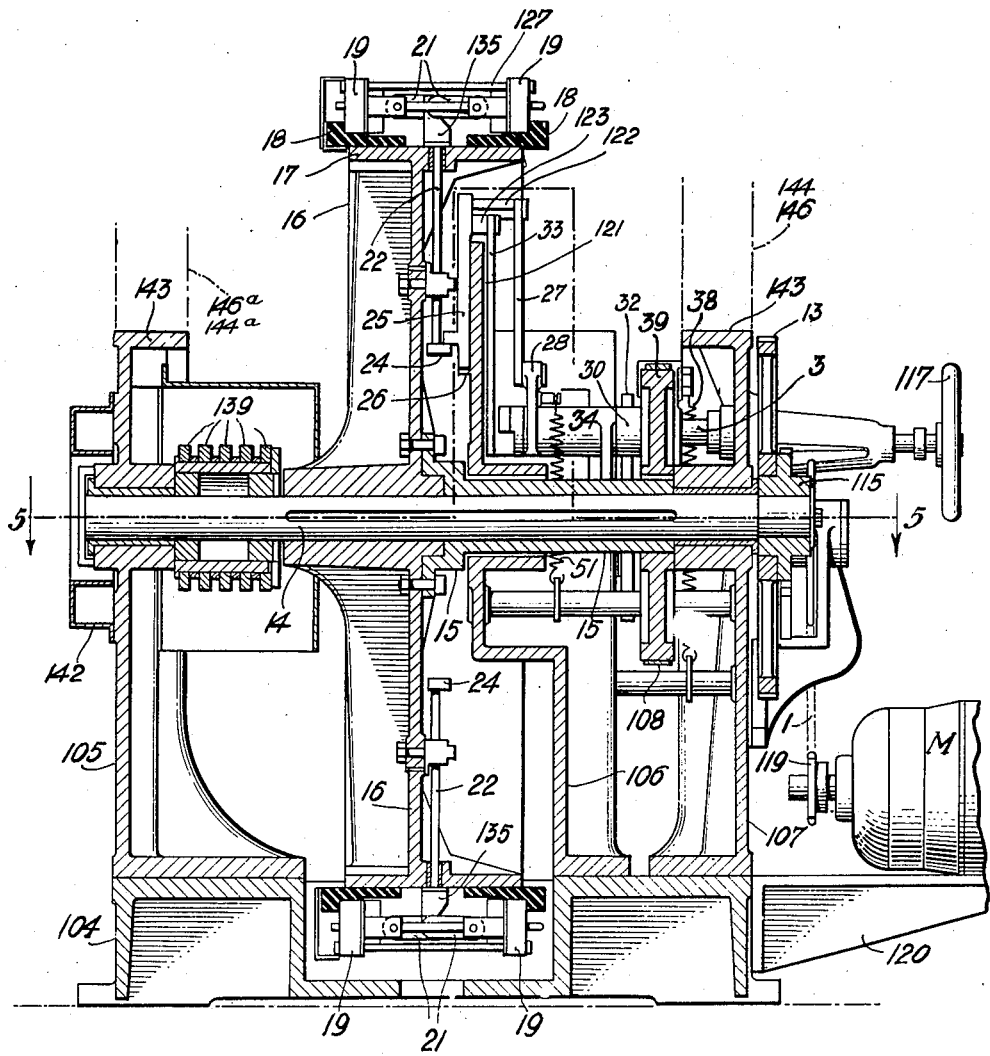
Figure 4 is a central vertical section taken in the plane of the line 4—4 of Figure 6 through the lower or spoon forming portion of this machine, with certain parts in elevation in the interest of clearness.

In Figure 1 of the drawings, I have shown in a diagrammatic way the apparatus illustrated in Figures 1–25 of the drawings. This figure is not intended to be an exact showing of the shapes of the various parts or of their proportions, but schematically illustrates the manner in which these parts are associated with one another and are operable in the manner hereinafter described, in order that a clear understanding may be had of how the operations of the machine are carried out.

Referring first to Figure 1, power from a prime mover, such as an electric motor, is delivered through a sprocket chain I to a sprocket 2 fixed on a lower cam shaft 3. On this shaft is fixed an arm 4 carrying a pin 5 adapted to cooperate progressively with the slots 6 of a Geneva disk 7. Between the slots 6, the periphery of the disk 7 is hollowed as at 8 to cooperate with a locking disk 9, cut away at 10, so as to clear the disk 7 while the pin 5 is driving this disk, but to lock the Geneva disk when the pin is disengaged from the slots. The parts 4, 5, 7 and 9 constitute collectively a Geneva movement, for the purpose of intermittently driving a shaft 11 with intermittent periods of rest or dwell.

Fixed on the shaft 11 is a pinion 12, meshing with and driving a gear 13 which, in turn, is fixed on main shaft 14 and keyed to this shaft is a sleeve 15 rigidly secured to the web of the die drum 16. The drum has a peripheral flange 17 on the face of which are mounted strips of heat insulation 18 and on these strips are supported a plurality of die couples arranged side by side around the entire face of the drum. Two pairs of die couples are shown in Figure 1 and are designated D and D', respectively. The die of each couple comprises a fixed die section 19 and a movable die section 20. The movable die sections are guided for movement toward and away from the fixed die sections, as will be hereinafter explained, and they are connected by toggle links 21, whereby, when flexed, the corresponding die couples will be opened and closed.

For operation of the toggles, each is connected at its elbow with an operating rod 22 and the operating rods and all of the couples extend radially inwardly through perforations 23 in the flange of the drum and carry at their inner ends operating feet 24. The constructions of all of the dies and all of the toggles with their respective operating rods 22 and feet 24 are identical. In other words they are duplicated about the drum, so that, when the drum is rotated through the Geneva movement and other operating connections which have been described, the operating feet of the several toggles will be successively, periodically brought into position to be operated upon by trains of mechanisms which will operate the toggles in predetermined sequence to close and open the dies.

In the showing of Figure 1, the two feet 24 are so illustrated that one is in position wherein it is about to be operated upon to close the toggle of the foremost die couple D, while the other is in a position wherein it has been just operated by mechanism to open the rear couple D' for the removal of the finished product. The operation of these toggles through the feet 24 is directly accomplished by a closing slide 25 and an opening slide 26, mounted for reciprocating movement substantially radially of the drum. The closing slide is connected by a link 27 to an arm 28 fixed on a shaft 29 to which is also fixed an arm 30. This latter arm carries a cam follower 31 acting against a cam 32 on the cam shaft 3. The toggle opening slide 26 is connected by a link 33 to a bell crank lever 34 which has a cam follower 35 acting against a cam 36 also fixed on the cam shaft 3. A spring 37 acts upon the arm 34 to normally depress the opening slide 26, while the spring 38 acts upon the arm 30 to normally elevate the closing slide 25. Thus the die closing slide 25 acts downwardly on the toggle to close the same under the positive operation of the cam 32, while the opening slide 26 acts upwardly under the positive operation of the cam 36. The spring 37 serves to maintain the follower 35 in contact with cam 36 and spring 38 serves to keep the follower 31 in engagement with the cam 32. The parts described are so timed that the closing slide 25 will be depressed while the Geneva movement is holding the drum at rest but just before it starts to move the drum, and the opening slide 26 will be operated while the Geneva movement is holding the drum at rest and immediately after the drum is so brought to a condition of rest.

In order to assure of quick stopping of the drum, so that the machine may be run at fairly high speeds, there is fixed to the bushing 15 of the drum a brake element 39 with an associate brake band, not shown in Figure 1, but controlled by a cam 40 on the cam shaft 3, and so positioned as to brake the drum as soon as positive rotation by the Geneva movement is completed.

With this arrangement, it will be apparent that the Geneva movement will periodically rotate the drum through a predetermined angle to bring the successive die couples consecutively into cooperative relation with the die opening and closing slides.

Immediately forward of the foot of the die closing slide 25, there is positioned a cam member 41 having a cam track 42 into engagement with which the feet 24 of the toggle operating rods 22 pass before they individually leave contact with the slide 25 and this cam track 42 is of decreasing radius in the direction of travel of the feet therealong, so as to progressively increase the die-closing pressure on the toggle as the drum is periodically rotated.

Arranged above the drum and at either side thereof are a pair of feed tables 43 on which are positioned horizontal stacks of flat wood blanks B of the shape shown in Figure 2. These are stamped from wood veneer and have the general outline configuration of a spoon. They are arranged in stacks with the bowl end down and are adapted to be urged in the direction of the arrows 44, so that the blanks at the forward ends of each stack normally bear against upright pushers 45 at the respective feeding stations for the forward die couple D. The pushers 45 are mounted for vertical reciprocation in such manner that, when raised above the blank stacks B, the stacks will move forward to position the end blank of each stack beneath and in alinement with one of the pushers, so that, when the pushers are subsequently lowered, they will move these two forward blanks simultaneously downward and introduce them into the dies of the forward couple, as shown in Fig. 1. Reciprocation is imparted to the pushers in proper timed relation with the operation of the dies in the manner next to be described.

The pushers are tied together for simultaneous operation, as indicated at 46, and depending from the rod is a pivoted yoke 47 pivotally connected to one arm of a lever 48 which is in turn fulcrumed on a rocker shaft 49. The other arm of the lever carries a follower 50 acting against the cam 51 fixed to an upper cam shaft 52. On this cam shaft is a sprocket 53 connected by a sprocket chain 54 to a sprocket 55 fixed on the lower cam shaft 3 and the upper cam shaft is driven from the lower cam shaft through these connections. Direction idlers 56 are mounted on an arm secured to a tie rod 57, so that the sprocket will clear the tie rod 57 and the rocker shaft 49. By these connections the pushers are operated in timed relation to the die operating mechanism, as well as the mechanism which rotates the drum, so as to introduce the blanks into the dies, when the dies are opened.

It will be noted that the cam 51 furnishes the power for elevating the pushers, whereas said pushers are lowered by springs 58 connected to a cross bar 59, rigid with the lever arm 48. These springs depress the pushers with yielding pressure, so that, in the event a blank jams or fails to properly feed, the apparatus will not be damaged.

After the spoons have been formed and otherwise completed, as will be hereinafter more fully explained, they finally come into the position of removal in which is shown the rear die couple D' in Figure 1, and they are removed from these dies by a pair of grippers 60. These grippers each embody a fixed jaw 61 and a movable jaw 62 normally spring pressed by a spring 63 to cause the jaws to close, but so constituted that, when pressed against the upper end of a formed spoon, the jaws will yieldably open until the spoon is gripped and held by spring pressure in the grasp of the grippers.

These grippers are supported on the lower ends of spoon-removing plungers 64 mounted for vertically inclined longitudinal reciprocation toward and away from the dies D'. They are pivotally secured at their upper ends to a tie rod 65 which is, in turn, secured to the rear ends of operating levers 66, the distant ends of which are pivoted to fixed brackets 172. These levers are each connected by a link 67 to one end of a rocker 68, the other end of which carries a follower 69, held against a cam 70 by a spring 71 associated with the tie rod 65. The cam 70 is fixed on the upper cam shaft 52, so that the operations of the spoon removing grippers are timed with respect to the operations of the toggle operating mechanism of the dies.

Through the connections described, synchronized as specified, the rear dies D'—D' will be opened after they have been brought into cooperative relation with the grippers and in proper timed relation with this operation, and preferably slightly before these dies are opened, the grippers descend and engage with and grip the finished spoons in the die couples D'—D', while these dies are at rest. The cams 70, which are duplicated for each griper, now act through the connections described to lift the grippers until they are an appreciable distance above the plane of the top of the dies, whereupon the upwardly extending tails of the pivoted jaws of the grippers engage with fixed cam stops 72, mounted in their paths and, as the upward movement of the grippers continues, the pivoted jaws of the grippers are rotated about their pivots sufficiently to release the finished spoons. These fall by gravity into buckets 73, hereinafter described and which in the meantime have been brought into position below the finished spoons, designated by the reference characters S in Figure 1. The spoons fall into these buckets and are adapted to be conveyed thereby to appropriate places of delivery.

The buckets which thus individually receive the finished spoons are mounted in suitable numbers on each side of the machine in a manner to travel successively apast and beneath the point of discharge of the spoons by the grippers. As shown, each set of these buckets is fixed on an endless sprocket chain 74 extending around spaced apart sprockets 75 and 76. This arrangement is duplicated at opposite sides of the machine, but only the right hand assembly is shown in Figure 1. Here it will be noted that the shaft 77 of the sprocket 76 carries a bevel pinion 78 meshing with a bevel gear 79 fixed on a shaft 80 of a ratchet wheel 81. On the shaft 80 is pivoted an arm 82 carrying a pawl 83 to cooperate with the ratchet 81 and a link 84 connects the arm 82 to one arm of a bell crank 85. This bell crank is pivoted on the rocker shaft 49 and its other arm carries an idler 86 held against a cam 87 by a spring 88. The cam 87 is fixed on the cam shaft and is driven thereby. The gearing connections, teeth of the ratchet, and shape of the cam are such as to cause one of the buckets to be moved beneath a finished spoon, as soon as the spoon is lifted above the plane of the buckets by the corresponding gripper and to move such bucket out of the path of the gripper before it again descends to pick the finished spoon out of the next die.

As the machine operates, step by step in a manner which will be now understood, the buckets with spoons therein will be brought one by one into the position of the right hand bucket in Figure 1 or into a corresponding position at the left hand side of the machine, and at this point a fixed abutment 89, in the path of such buckets, will act upon them one at a time at each side of the machine to open the bottom of the buckets and drop out each finished spoon, so that it is adapted to fall through a chute 90 to a convenient place of delivery. The spoon, as thus delivered, is in finished form and by preference is fed by the chute 90 to suitable wrapping apparatus wherein it is wrapped in an appropriate paper or cellulosic container and sealed ready for the market.

To permit of the discharging of the spoons from the buckets in the manner described, each bucket has a movable bottom mounted on an operating tongue pivoted to the bucket and normally spring pressed to close the bottom. This tongue has a camming projection on its outer face above the pivot and, when this projection engages the fixed abutment 89, continued travel of the bucket will cause the tongue to be tilted and the bottom will be opened to discharge the spoon.

The operations described in connection with the removal of the finished spoon from the dies, and its delivery, are duplicated at opposite sides of the machine through duplication of the mechanism hereinbefore described.

In the manipulation of wooden blanks into spoon form, it is essential that the die forming operation be carried out while the wood is moist. Means is therefore provided for supplying this moisture and in the machine shown in Figure 1 in the drawings, such moisture is atomized onto the blanks as they are individually fed from the stacks to the dies. The atomizing mechanism and its controlling devices are shown in Figure 1. Water or any other liquid suitable for the purpose is fed through a pipe 91 to a valve 92, beyond which a branch tube leads to the spaces between the tables and the dies. The two branches of this tube are designated 93 and they may terminate in atomizer nozzles if so desired. The valve 92 is normally closed, but bearing against its valve stem is a lever 94 adapted to be periodically engaged by a pin 95 carried by an arm 96 which is fixed to the upper cam shaft 52. The position of the arm 96 is such that it will open the valve momentarily as blanks pass the outlet ends of the tube branches 93, so that liquid is atomized onto the blanks on their way to the dies. The arrangement is such as not to cause a drenching of the blanks, but rather the supply of sufficient moisture to result in the generation of the requisite amount of steam to produce the necessary moldability of the wood stock.

During the feed of blanks from the tables 43 into the dies D—D, the dies are of course opened to receive these blanks and it is therefore necessary to support such blanks in proper position in the die until the dies can close and grip them. The design of the dies is such that the blanks preferably are slipped in between the die sections with slight friction, but this cannot always be depended upon to hold them in proper position until the dies are closed. Consequently means is provided to frictionally grip and hold the blanks during the latter portion of the feeding thereof and until the dies close sufficiently to grip them. The mechanism whereby this is accomplished will be hereinafter more fully described. It is shown specifically in Figures 14, 16 and 17, but the means for operating the same is illustrated in Figure 1 as comprising a rocker 97 pivoted on the tie rod 57 and provided at its upper end with a follower 98 coacting with the cam 99 on the upper cam shaft 52. The rocker carries at its lower end an elongated bar head 100 and this head is sufficiently long to act upon the clamping devices associated with both dies of the forward couple for the purpose of holding the blanks as stated.

Particular attention is called in connection with Figure 1 to the cam 42 in the lower portion of the machine for it is this cam which controls the progressive closing of the dies after the blanks have been inserted. The toggles of the dies are of course initially closed by the closing slide 25, but they do not completely close each die, they merely partially close it, because if these dies were immediately forced to final closed position, they would split and break the blanks. Sufficient time must be allowed for the blanks to heat up and become permeated with the steam from the moisture thereon. Consequently, it is the function of the closing slide to merely partially close each die in order to tightly grip the blank therein and shape it to a slight degree. The dies are fully closed by the cam face 42, different portions of the length of which progressively act upon the die toggle as the drum is moved step by step to cause the foot 24 of the corresponding toggle to traverse the length of the cam track. The radius of this cam track becomes increasingly less in the direction of its length, until at its end the radius is sufficiently small to have carried the die toggle slightly beyond dead center, so that said toggle becomes locked in die closing position and will remain locked as the foot 24 leaves the end of the cam track. As the drum continues to be intermittently rotated, the toggles remain locked as they leave the cam track until they finally are consecutively brought into cooperative relation with the die opening slide 26. The distance travelled in the interim will constitute almost a complete circle. The elapsed time will be sufficient, not only to complete the forming of the spoon, but a sufficient drying (due to the heat in the dies), so that the material is set and will retain its shaped condition after the articles have been removed from the dies. After the feet of the toggles have been brought into a position above the die opening slide, this slide is operated to flex the toggle to open the dies, so that the spoons may be removed in the manner described. The arrangement described provides for intermittent feed of blanks in closely timed sequence and a corresponding removal of the finished product, but with a relatively long intervening period of treatment during which the blanks are formed and set in finished shape. The spoons, as they leave the machine, are in the form shown in Figure 3.

From the foregoing description of the invention, as exhibited in Figures 1–3, the mode of operation of the apparatus will be apparent. Some understanding will also be had of the mechanical parts which enter into the construction. However, and inasmuch as it is not feasible in a drawing, such as Figure 1, to accurately show the construction of these parts, I shall next consider the construction of the several parts of the machine of Figures 1–25, where it is felt desirable to a more clear understanding of the present invention in one of its preferred practical forms. In Figures 4–25 the same reference numerals as used in Figure 1 will be employed to designate the corresponding parts with supplemental detailed description where it is thought desirable.

Figure 5:
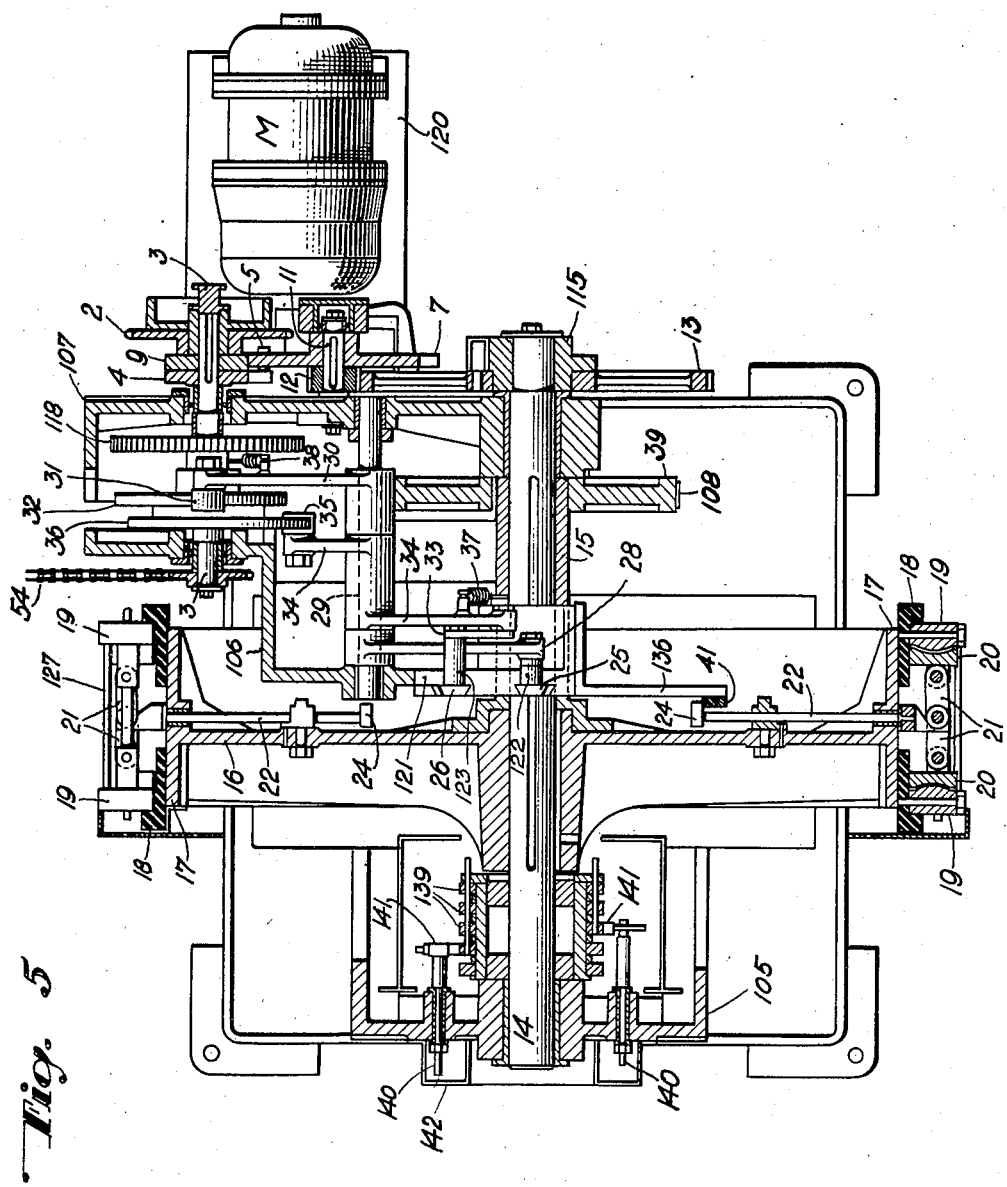
Figure 5 is a plan view taken on the broken line 5—5 of Figure 4.
Figure 6:
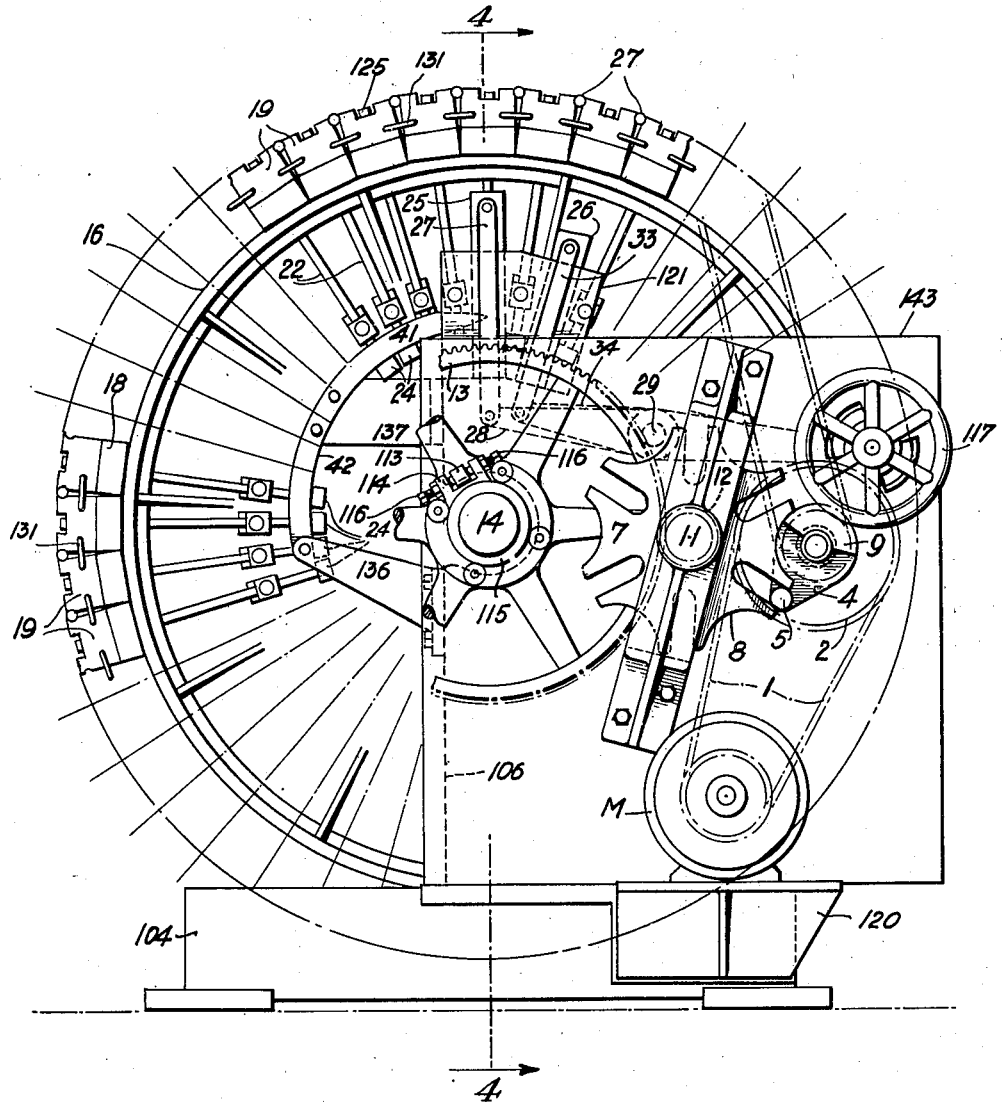
Figure 6 is an end elevation of the spoon forming portion of the machine of Figures 1–25, taken from the right hand end of Figure 4, with certain parts omitted in the interest of clearness.
Figure 7:
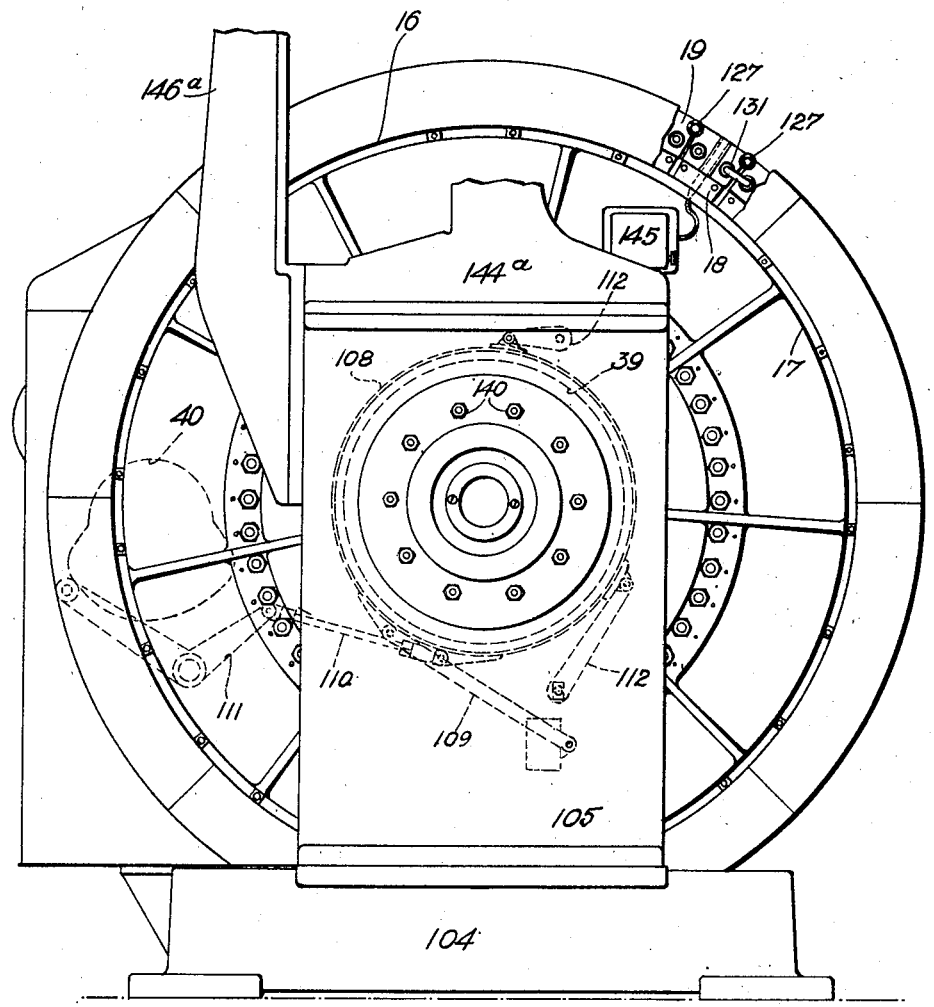
Figure 7 is an end view of the spoon forming portion of said machine taken from the left hand end of Figure 4.

From Figures 4–7 it will be noted that the entire machine is mounted on a base 104 on which are superimposed three spaced apart standards or frames 105, 106 and 107. The shaft 14 which carries the drum 16 extends through all of these frames and is journalled for rotation in the two end frames. The bushing 15, which is bolted to the hub of the drum, passes loosely through an opening in the intermediate frame 106, is keyed to the shaft 14 and carries the brake drum 39. The brake band 108 which cooperates with this drum is best seen in Figure 7. One end of this brake band is anchored by a link 109 to the end frame 105, while its other end is secured to a link 110 connected to a rocker 111 carrying a follower which rides on the cam 40. Stay links 112 hold the brake band in position with reference to the face of the brake drum.

The gear 13, as best shown in Figure 6, is mounted on the shaft 14 for circumferential adjustment in order to permit of timing of the parts. To this end the gear 13 is loosely mounted on said shaft but carries a lug 113 projecting between the arms 114 of a yoke forming part of a collar 115 fixed on said shaft. Adjusting screws 116 permit of such angular adjustment as may be necessary to obtain accurate timing between the operations of the Geneva movement and the position of the dies.

The hand wheel 117 appearing in Figures 4 and 6 is affixed to a shaft normally spring retracted, but provided at its inner end with a pinion not shown. This hand wheel when pressed inwardly may be brought into mesh with a gear 118 on the lower cam shaft 3, so that, when the hand wheel is turned, the entire apparatus may be manually operated to shift the parts into particular positions which for any reason or other it is desirable to have them when the parts are brought to rest. The normal drive is from the motor M which drives a sprocket 119 meshing with the main drive chain 1. This motor is mounted on a bracket 120 supported at one end of the base 104.

The closing slide 25 for closing the dies, as well as the die opening slide 26 are mounted in guides on an upstanding portion 121 of the intermediate frame 106, so as to extend substantially in a radial direction, as shown in Figure 6. These slides respectively carry rigid extension arms 122 and 123 which reach laterally over the part 121 of the intermediate frame, so that the links 27 and 33 may pass unobstructedly to the rockers 28 and 34 which operate them.

All of the die couples are identical in construction and in Figures 8–10 the details thereof are shown. The fixed die sections 19 constitute the male sections of the die. They are made in the form of solid blocks provided therethrough with vertical holes 124 through which are passed anchoring studs 125. These studs are tapped into the insulating material 18 which is secured to the face of the drum 16 and the outer face of this insulating material is rabbeted to receive these die sections. Screws 126 pass through the insulating material and thread into the die sections 19 to assist in securing said sections in rigid spaced apart relation. Tie rods 127 extend between the dies of each pair with washers 128 bridging the gap between them, so that these tie rods serve circumferentially adjacent pairs of dies and, together with the studs 125 and screws 126, preclude lateral separation of the male members 19 of the dies.

Extending between the two male sections 19 are tubular guides 129 locked in place by set screws 130. These guides extend through bushings in the female die sections 20 and thus mount said sections for sliding movement toward and away from the male sections 19. Electrical heating elements 131 of U-shaped form are so arranged that one leg of each element extends through one of the guide rods 129 of each two adjacent pairs of dies and consequently each heating element thus serves said two die pairs. The insulating elements are braced by brackets 132 mounted on the outer sides of the male sections.

Each of the female sections 20 carry a wrist pin 133 and is bifurcated to receive on these wrist pins the distant ends of the toggle arms 21. The elbow pin 134 of the toggle passes through the overlapping links as shown and through the bifurcated upper end of the fitting 135 to which the upper end of the operating rod 22 is rigidly secured. It will be noted from Figure 9 that the fitting 135 is closely adjacent the outer face of the drum when the links of the toggle are at dead center, so that, as soon as the toggle has been drawn slightly beyond dead center, the fitting 135 will engage with the outer face of the drum and preclude the breaking of the toggle either inwardly or outwardly. Consequently, if blanks are in the dies, the dies will be locked closed thereon until the toggles are forcibly flexed in an outward radial direction. This permits the cam 41 of Figures 1 and 6 to be made relatively short. In fact it only need be long enough and of such pitch as to allow of the closing of the dies to the desired extent in the period in which it is possible to do so without splitting the wood, with the tail or lower end of the cam track such as to leave the toggles below dead center, i. e., locked, in which position they will remain locked until they are flexed outwardly by the releasing slide 26.

The mounting for the cam track 41 will be clear from Figure 6. It is supported on its lower end by a bracket 136 mounted on the intermediate frame 106, while the upper portion of the cam track is supported in a similar bracket 137, also mounted on the same frame.

In order to insure accurate positioning of the blanks in the die, each die is provided with internal pins 138 shown in Figure 10 and in this figure a blank is indicated in the position which it occupies with respect to these pins.

Current is supplied to the heating elements 131 of the several dies by suitable wiring connections (not shown) with a series of collector rings 139 mounted on the lower shaft 14, as shown best in Figures 4 and 5. To these rings current is supplied from terminals 140 having brush connections 141 with the rings. The terminals are contained within a removable housing 142.

It will be noted from Figures 4, 6 and 7 that the upper portions of the lower end frames 105 and 107 are inwardly flanged to provide seats 143 for the reception of upper frame sections which support the means for holding and feeding the blanks and for removing the finished products and conveying them away. The particular frames and the parts which they support are shown in Figures 11-23 and reference is now directed primarily to the sheets containing these figures.

Resting upon the flat seats 143 of the lower end frames 105 and 107 are two upper frames 144—144a, shown best in Figures 18 and 7. These are firmly bolted to the lower frames and secured across them is the elongated, relatively narrow plate 43 which extends for substantially the full width of the machine. This is a rigid plate and forms a support for the blanks and the blank feeding mechanisms. Back of the frames 144 and 144a are two upstanding frames 146 and 146a, the former of which rests on the seat 143 of the end frame 107, as in Figure 18, while the latter is bolted to the back of the end frame 105 as in Figure 7. These frames 146 and 146a collectively support the cam shaft 52, the rocker shaft 49, and the tie rod 57.

The standards 147, shown as mounted in inclined relation in Figure 18, are positioned at each end of the machine and are shown in detail in Figure 19. Each of the standards 147 embodies an upstanding portion which is tilted rearwardly and is provided with an inwardly extending arm 148 projecting toward the center of the machine. This arm carries the stub shaft 149 which supports the idler sprocket 75, shown in Figure 1, while the drive sprocket 76 is carried by bearings formed on the upstanding part of the standard. The sprocket chain 74, which carries the several buckets 73, is passed around these two sprockets and is driven from the shaft 77, rigid with the sprocket 76 and connected to the shaft 80 of the escapement disk 81 by the bevel gears 78 and 79. The ratchet 83, with its operating arm 82 and its link connection 84 with the rocker 85, hereinbefore described in connection with Figure 1, are very clearly shown in Figure 19. The ratchet disk 81 and its operative connections are also shown in Figure 20. The general relation of the buckets to the remainder of the structure is also shown in Figures 11 and 12.

The pushers 45, diagrammatically illustrated in Figure 1, are shown structurally and with their mountings in Figures 18 and 21. They are supported upon a guide block 150 shown in Figure 18 as mounted centrally of the plate 43. The guide block 150 is, in horizontal cross section, substantially of I-beam form and it is bolted to the plate 43. It is stayed by an integral arm 151 which extends rearwardly and has a boss 152 through which the tie rod 57 passes (see Figure 21).

At the opposite lateral faces of the guide block are formed upright guides, undercut to receive therein pusher rods 153 thus mounted for vertical reciprocation. To the outer faces of the pusher rods are connected pusher blades 154, with notches at their lower ends 155 (see Fig. 18) and it is these notched ends that engage with the upper ends of the individual blanks and feed them downwardly to the dies. The blades 154 have a thickness approximately equal to or slightly less than the thickness of the blanks B.

The upper ends of the pusher rods 153 are provided with rigidly attached, upwardly extending cylindrical stems, threaded to receive jamb nuts 156 and between the jamb nuts and the rods are positioned sleeves 157, perforated at 158. Springs 159 are interposed between the sleeves and the upper ends of the pusher rods, so that downward impulse of the sleeves upon the pusher rods, to feed the blanks, is cushioned by these springs. Through the perforations 158 of the sleeves 157 of both bushings is passed the tie rod 46 of Figure 1 and on this tie rod is hung the yoke 47 connected, in turn, to the lever 48 (see Fig. 21) which carries the cam follower 50, coacting with the cam 51. The springs 58, which act upon the cross rod 59 to feed the blanks, when so permitted by the cam 51, are clearly shown in this figure, as well as in Figures 11 and 12.

The blanks are adapted to be received in horizontal stacks in guides 160 (Fig. 18) on the transverse plate at each side of the guide block 150 and are adapted to be pressure fed. To this end, there is mounted for sliding movement, on the plate 43, followers 161. Attached to each follower are the free ends of a cable 162 (Figs. 11 and 12). The two reaches of each cable extend from the follower toward the guide block 150 on each side of the guide 160 and pass around directional pulleys 163, then pass laterally around guide pulleys 164 and, in the loop, is a pulley 165 mounted on a weight 166. The mass of its weight tends to draw the followers 161, at the opposite ends of the machine, toward one another to force the forward ends of the blank stacks against the outer faces of the guide block 150 and to thus position the forward blank of each stack in the path of one of the pusher blades, so that when the blades descend they feed the foremost blanks at both sides of the machine. As the blades are retracted the weights feed the next blanks into alinement with the blades for the next operation.

I have hereinbefore referred, in connection with Figure 1, to the rocker 97, its operating cam 99 and its elongated head 100 and have stated that the purpose of this construction is to guide and hold the blanks, while they are fed from the feeding station to the dies. The structure whereby this is accomplished is shown in Figures 11, 16 and 17. Figure 17 shows the cam 99 fixed on the cam shaft 52 and acting upon the rocker 97 to actuate the elongated head 100. This head is broad enough to reach across and bridge the space between the power arms 167 of two levers associated, respectively, with the two feed stations. The work arm of each of these levers extends forwardly beneath the plate 43 and is pivotally connected to a clamping bolt 168, normally forced by a spring 169 in the direction of an abutment 168a at the opposite side of the opening 170 through which the blanks at the corresponding side of the machine are fed downwardly to the dies. The bell cranks and clamping bolts are duplicated at opposite sides of the machine, as will be seen in Figure 11 and the parts are so timed that, as the blanks are fed through the opening 170, the cam 99 will permit the springs 169 to force the clamping bolts against the blanks, so that the blanks are steadied and held in proper relation with the dies. As soon as the dies are preliminarily closed, however, the cam 99 will move to a position to retract the bolts for there is then no longer any requirement that the blanks be steadied. It will thus be noted that the clamping bolts are retracted by the head 100 before the drum starts to move.

The general relation of the elements constituting the upper part of the machine is shown clearly in Figs. 11 and 12. For a more complete understanding of the relation of the several parts on the cam shaft attention is directed to Fig. 13. The position of the parts on the rocker shaft is shown in Fig. 14, while the position of the parts on the tie rod is shown in Fig. 15.

In Figure 11 I have omitted the showing of the upper frame 144 in order that the frames 147 and 146 might be seen, it being clear from Figure 18 that the frame 144 extends downwardly from the plate 43 to the bottom of the frame 146.

The spoon removing devices are shown in Figures 22 and 23. Here the plungers 64, shown generally in Figure 1, are each supported in a vertical cylindrical guide 171 forming part of a bracket 172. There are two of these brackets, as shown in Figures 11 and 12, and they are supported on the cam shaft 52, the rocker shaft 49 and the tie rod 57, so that they are in effect suspended on these parts in properly spaced apart relation. The purpose of employing these brackets is to permit of a long throw of the spoon removing plungers through the use of reasonably gradual cams 70.

As shown in Figure 22 the cam of each plunger acts against the follower 69 of the rocker 68, secured by a link 67 to the lever 66 of the second class, the forward end of the lever being pivoted to the corresponding bracket 172, while the rear end of the lever is pivotally connected to the upper end of a plunger 64. The two cams 70, for the two plungers, act together upon the plungers to raise them in withdrawing the spoons from two die couples of each pair simultaneously. The fixed gripping finger 60 of each plunger coacts with the movable spring pressed gripping finger 62, the tail of which is adapted, when the plunger is raised, to enter into the tubular guide 171 and engage with the cam stop 72 within the guide and mounted on the end of an adjusting screw 173. The grippers are maintained against turning by a feather-and-slot connection 174 between the plunger and its guides (Fig. 23).

The bucket details are shown in Figures 24 and 25. Here the body of the bucket bears the referend character 73. It is open at both ends and has a movable bottom 175 integral with and carried by the lower end of an operating tongue 176. This tongue is mounted on a transverse pivot pin 177 carried by brackets 178 and a spring 179 is coiled about this pin and bears against the tongue to normally hold the bottom in its closed position. The camming projection 180 is carried by the tongue, above the pivot pin 177, and it is this projection which, when engaged with the fixed abutment 89, serves to tilt the tongue against the tension of the spring 179 and open the bottom to discharge the spoon.

It will be noted that the bottom, when in its closed position, does not completely close the bottom opening of the bucket, so that, when a spoon is dropped into the bucket, it comes to rest in the position indicated in dotted lines in Figure 24. The spoon is supported in this position until it is discharged from the bucket into the chute 90, when the bottom 175 is opened.

The box 145 shown in Figure 7 is a heat control device for the die heating elements and may be of any suitable and conventional thermostatic type which will control the feed of electric current to the heating elements 131, to maintain the dies at proper uniform temperatures.

Having thus fully described the construction of the machine shown in Figures 1–25 of the drawings, I shall now proceed with the description of the modified form of machine shown in Figures 26–35. This second machine is similar in many respects to the first machine, so that detailed description of such parts as are common to the two machines need not be repeated here. The present description will be directed, more particularly, to fundamental differences in structure and mode of operation which, in the second machine, are in many instances simplified and rendered more universal in their application.

Figure 28:
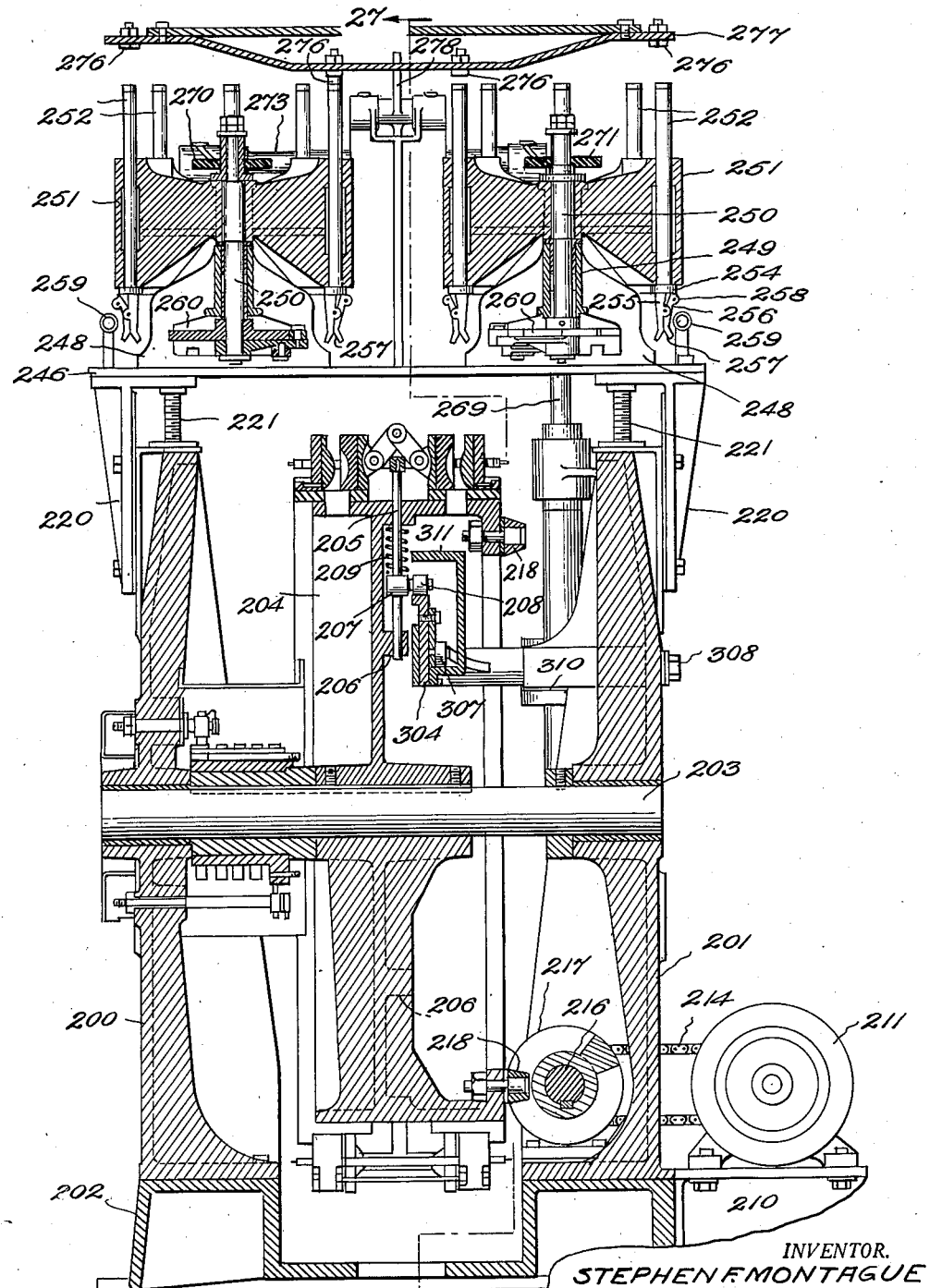
Figure 28 is a vertical section in the plane of the line 28—28 of Figure 27.

As shown best in Figure 28, the second machine embodies two end frames 200 and 201 mounted upon an appropriate base 202 in a rigid manner. The main shaft 203, which corresponds to the shaft 14, is journalled in these two end frames and carries the drum 204 which corresponds to the drum 16. On this drum are supported a succession of pairs of die couples of the same character as shown in Figs. 8 and 9 of the first machine and they are mounted in the same way and are provided with like toggles, but with this difference, viz., each toggle operating rod 205 is guided at its inner end in an annular rib 206 formed on the web of the drum. On each toggle operating rod is fixed a roller carrier 207 and each such carrier supports a roller 208 which constitutes a main cam follower. A spring 209 embraces each operating rod, between the carrier 207 and the rim of the drum, and normally tends to impel the movable members of the corresponding die couple into closed position. The purpose of these springs is to cause the dies to grip blanks when the blanks are introduced into the dies and to frictionally hold them until they are positively acted upon by the dies as will be presently explained. The springs 209 are not sufficiently strong to actually form the blanks into spoons. They merely serve as preliminary holding devices when the blanks are introduced.

In the first machine, the drum was advanced intermittently in a step by step manner by means of a drive embodying a Geneva movement. In the second machine, however, a barrel cam and roller drive is used, as the latter is more positive, is conducive to less wear and transmits power through a larger radius with consequent less undesirable torque on the driving connections.

Figure 26:
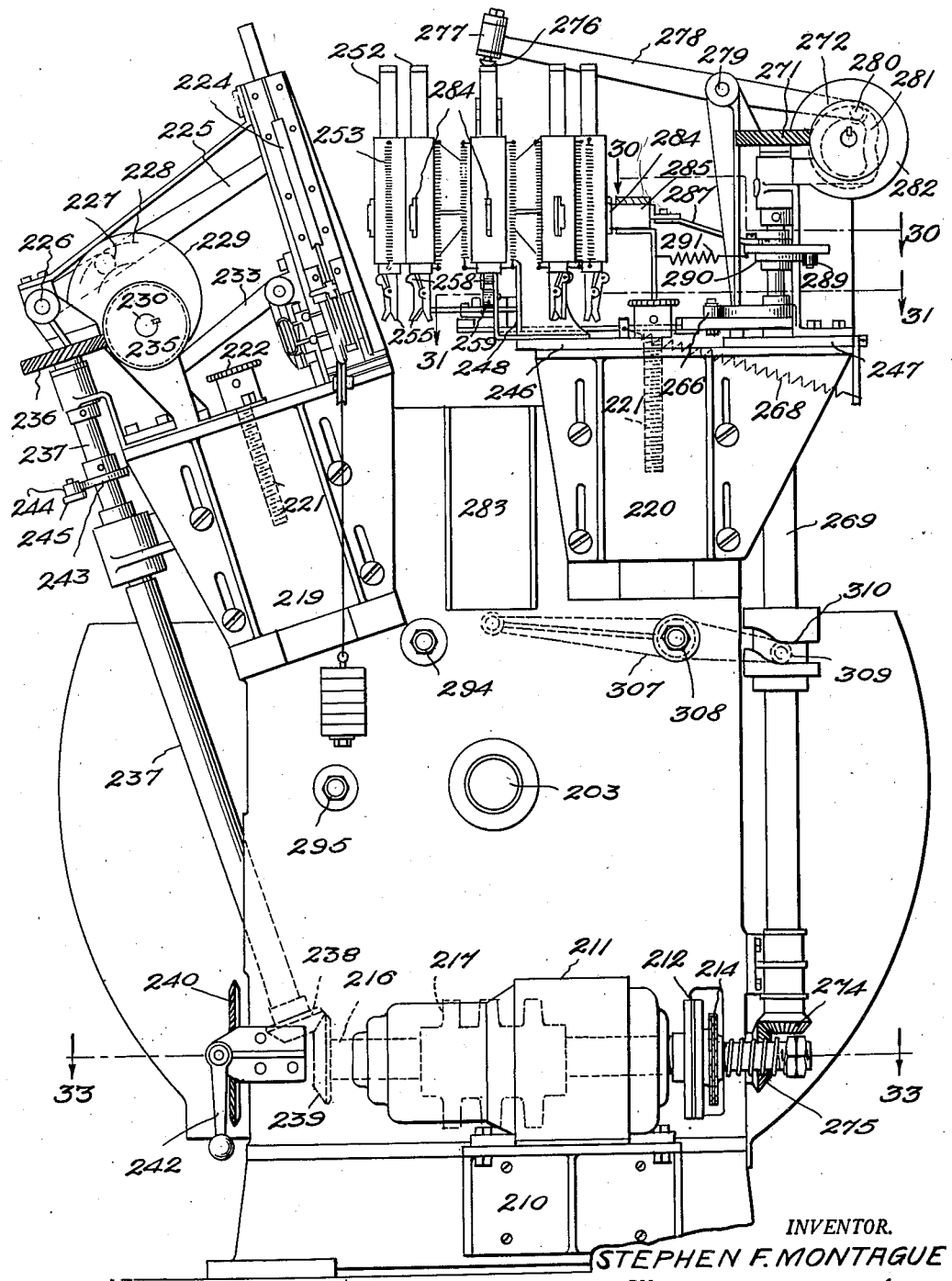
Figure 26 is an end elevation of the modified form of the spoon forming machine embodying the present invention illustrated in Figures 26–33 inclusive.

As shown in Figures 26, 28 and 33, there is mounted on the exterior of the end frame 201 a bracket 210 supporting a prime mover in the form of a motor 211. On the shaft of this motor is a friction clutch 212 through which is driven a sprocket gear 213. A sprocket chain 214 passes from this gear through an opening in the end frame and about a gear 215 (Fig. 33) on a main drive shaft 216 interiorly of said end frame. This is a horizontal shaft and it carries between its ends a barrel cam 217 adapted to coact with a succession of rollers 218 which are arranged about an adjacent flange on the drum 204, as clearly shown in Figures 27, 28 and 33. This barrel cam is shown in elevation in Figure 34 and its surface development is illustrated in Figure 35. From this showing it will appear that, although the motor 211 operates at a constant speed, the drum will be rotated through 160° of rotation of the barrel cam, while through the remaining 200° of such rotation, the drum will be held at rest. The cam has twin grooves, as shown, so that two consecutive rollers 218 are at all times in engagement with the cam and the drum is thus under continual control thereof. The throw of the barrel cam is such that its successive rotary impulses to the drum will equal the distance between centers of successive pairs of die couples on the periphery of the drum.

By this method of operation the large and heavy drum can be quickly stopped and started and properly centered without undue strain on the working parts and without such appreciable wear as would interfere with the proper functioning of the machine. Furthermore, less power is required for this operation.

Figure 27:
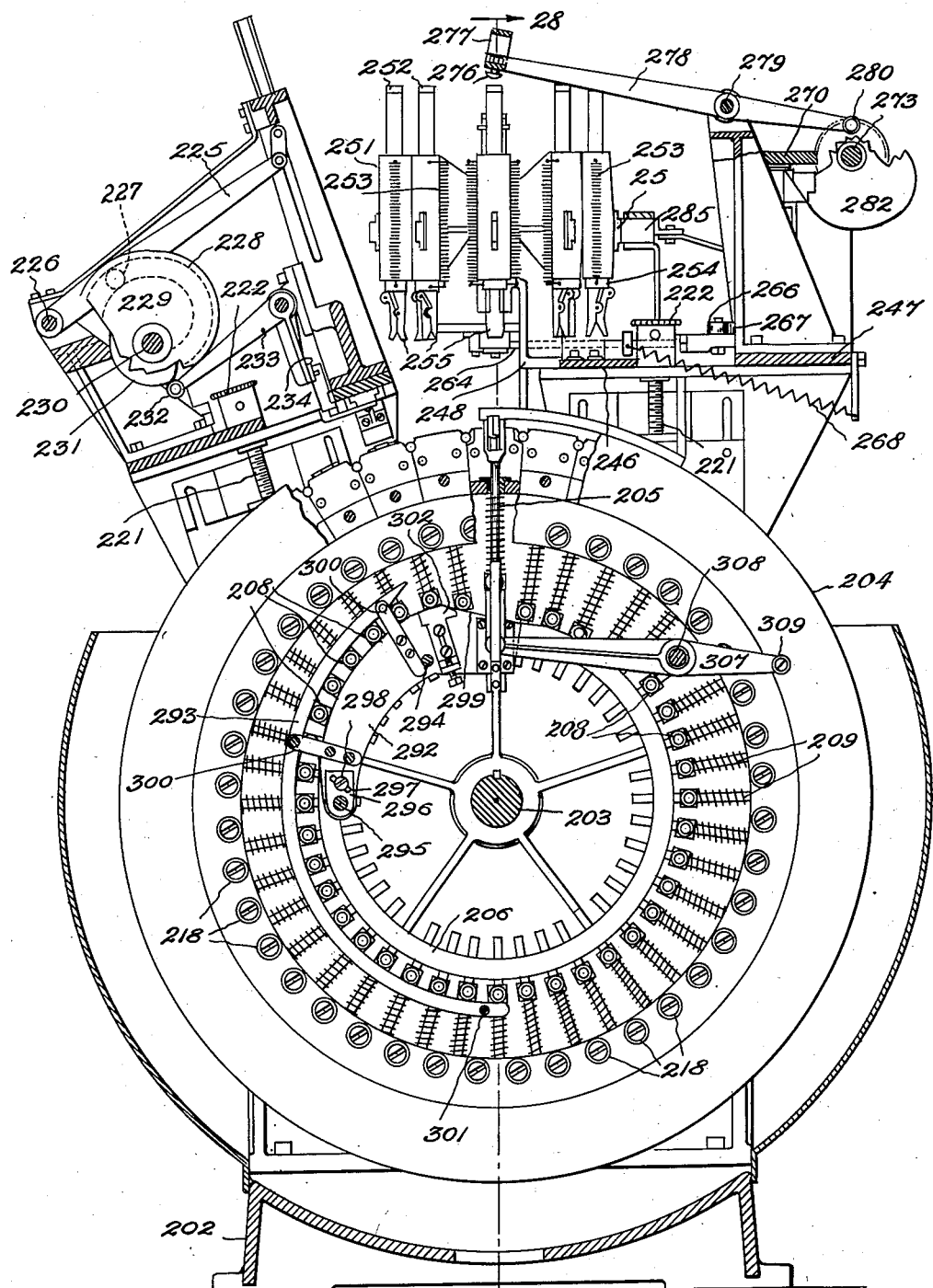
Figure 27 is a vertical section, taken in the broken plane of the line 27—27 of Figure 28.

In the first machine the upper frames 144 and 144a which carry, among other things, the blank feeding and spoon removing mechanisms, are rigidly bolted to the lower frames 105 and 107. In the second machine, however, the upper frames 219 and 220 (Fig. 26), which carry these mechanisms, are supported for adjustment to different elevations to adapt the machine to form spoons of different lengths. As shown in Figures 26, 27 and 28, these upper frames carry adjusting screws 221 which are threaded into the upper portions of the end frames and carry at their upper ends sprockets 222 with the sprockets of each frame connected by sprocket chains 223, shown best in Figure 29, so that by rotation of these sprockets, the frames 219 and 220 may be selectively vertically adjusted to adapt the machine to act upon blanks of different lengths. The shafts which extend between the lower and upper portions of the machine, as presently explained, are preferably provided with splined or slip connections to permit of this adjustment without change of shafting.

In the second machine, the flat blanks to be fed are supported on feed tables, as in the first machine, and are fed to feeding stations in the same manner, to be fed to successive die couples by pusher or feeder blades 224 (Fig. 26) which are adapted to be operated through intermediate connections, as in the first machine, by an operating lever 225, which corresponds to the lever 28. The operation of this lever, however, is different than in the first machine, wherein the pusher blades feed the blanks by the elastic pull of the spring 58. In the second machine, the operation of the pusher blades in both directions is positive. That is to say, the outboard end of the lever 225 (Fig. 27) is supported on a fixed pivot 226, while the lever carries a follower 227 intermediate its ends and this follower operates in a cam track 228 formed in the face of a cam 229 fixed on a shaft 230 (Figs. 27 and 29). As the shaft 230 is rotated, the feeder blades are positively raised and lowered to feed the blanks to the die couples during periods of rest of the latter.

The shaft 230 also carries a cam 231 and this cam operates the follower 232 of a bell crank lever 233 which acts upon an elongated bar 234, corresponding to the part 100 in the first machine and operating corresponding mechanisms to steady the blanks as they are fed to the dies.

The shaft 230 is provided at one end with a 45° gear 235 meshing with a corresponding gear 236 on an upright shaft 237 (Figs. 29 and 26) and the shaft 237 extends downwardly and carries at its lower end a beveled gear 238 meshing with a like gear 239 on the main power shaft 216, as illustrated in Figures 26 and 33.

In the latter figure, the power shaft 216 is shown as extended to carry a beveled gear 240 meshing with the pinion 241 to which is attached a crank handle 242, the purpose of which is to permit the machine to be turned over by hand when desired.

In the first machine, the atomizing of water onto the blanks, as they are fed from the feeding stations to the dies, is controlled through the operation of the valve 92 from a crank 96 on an upper counter shaft. In the second machine this arrangement is materially simplified by mounting on the shaft 237 a cam 243 (Fig. 26) which acts upon a follower 244 on a lever 245 which corresponds to the lever 94 of Fig. 1 and which acts upon a valve 92 in like manner to control the supply of water.

In the first machine the removal of the formed spoons is accomplished by a pair of grippers 60 which grasp the spoons in the dies, elevate them and then discharge them, by the action of stops 72, into buckets on endless conveyors which carry the spoons to discharge points at opposite sides of the machine. In the second machine, this arrangement is greatly simplified and rendered more positive by substituting for a single pair of grippers, two batteries of revolving gripper turrets which not only remove the formed spoons from the dies, but also deliver them to discharge points at opposite sides of the machine.

The upper drum 220 includes two parallel horizontal plates 246 and 247. Mounted on the top of the plate 246 are two upstanding turret supporting brackets 248 which are spaced apart transversely of the machine, as shown in Figure 28. Each of these brackets carries an upstanding hub 249 and in each of these hubs a vertical spindle 250 is mounted for rotation. Rigidly locked to each spindle 250 is a turret 251, rotatable with the corresponding spindle and of spider-like form. Near the outer periphery of each spider are a plurality of upstanding bearings, shown eight in number, and through each bearing extends a gripper plunger 252. These gripper plungers are adapted for axial reciprocation in said bearings but are normally held in elevated positions by means of coil springs 253. The upper end of each coil spring is attached to the turret, while the lower end of each coil spring is attached to a fixed collar 254 formed on the plunger 252.

Each plunger carries at its bottom a gripper comprising two jaws, the jaw 255 being rigid with the plunger and the jaw 256 being pivoted to the rigid jaw, as shown in Figures 27 and 28. The free ends of each pair of jaws of the grippers are tapered outwardly to provide a re-entrant mouth 257 (Fig. 28) and the jaws are normally spring impelled into closed position in any suitable manner, as, for example, by springs 63 of the kind shown in Figure 23. The upper end of each movable jaw is provided with an operating nose 258 which, when brought into engagement with an abutment 259, as hereinafter described, will cause the jaws to be separated to release a spoon clamped between them.

The spindle 250 of each turret has rigidly secured to its lower end a ratchet disk 260, see Figure 31, and directly beneath each disk a ratchet arm 261 is mounted to swing about the spindle 250. The outer end of each ratchet arm carries a pivoted pawl 262 held against the periphery of the ratchet disk by a spring 263. To the ratchet arm 261 is secured a rod 264 adjustably attached to a plate 265 which carries a cam follower 266, held in engagement with a cam 267 by springs 266'. These parts are duplicated for each turret, and as shown in Figure 29, the cams 267 are fixed to two parallel upright shafts 268 and 269.

The shafts 268 and 269 are respectively provided at their upper ends with 45° angle gears 270 and 271 which mesh with similar gears 272 fixed on a counter shaft 273 (Fig. 29), so that the shafts 268 and 269 will be rotated at the same speed. The shaft 269 extends downwardly and is provided at its lower end with a bevel gear 274 meshing with a bevel gear 275 on the outboard end of the main drive shaft 216 (Figs. 26 and 33), so that the turrets are rotated at the same speed, but in opposite directions from the main drive shaft through the ratchet connections described. Through this rotation the grippers are successively brought into vertical alinement with formed spoons as the dies of each couple are brought by rotation of the drum into vertical alinement with these plungers at the positions of spoon removal.

The grippers are normally held by the springs 253 in raised position appreciably above the spoons, but they are adapted to be selectively lowered for the purpose of picking the spoons out of the dies and for subsequently discharging the spoons. These operations are accomplished by four pressing buttons 276 mounted on a yoke 277, carried by an arm 278, mounted on a fixed pivot 279 and carrying a cam follower 280. The cam follower operates in a closed track 281 in a cam disk 282 (Figs. 26-29). Through rotation of the cam disk 282, the yoke 277 periodically depresses the pressing buttons 276 to engage selected gripper plungers in such manner that two diametrically opposed plungers of each turret are operated simultaneously. The two adjacent gripper plungers, shown as contiguous in Figure 28, are by this operation simultaneously depressed to bring the re-entrant mouths 257 of their grippers in contact with the upwardly projecting handles of the spoons in the alined dies, and the pressure of the plungers is sufficient to force the jaws of the grippers to straddle the spoon handles, so that the spoons are gripped thereby. At the same time, the two distant gripper plungers 252 will also be depressed and in so doing will engage the operating noses 258 of the movable jaws of their grippers with fixed roller abutments 259 which will simultaneously open the jaws of these two grippers, so that spoons previously engaged with said grippers will be released, to fall into troughs 283 positioned at opposite sides of the machine. These troughs deliver the spoons out of the machine, preferably to suitable wrapping devices associated therewith.

It is essential that the gripper plungers be accurately alined with the spoons in the dies and consequently the turrets must be accurately rotated to bring successive plungers into such alined positions. This is assured by providing the periphery of the turrets with stops 284, one of which is juxtaposed with each plunger, and utilizing a registering device cooperating with the stops of each turret. As shown best in Figures 26 and 30, I associate with each turret a slide 285 provided at its end with a notch 286 to engage with the stops 284. Each slide is connected by a strap 287 with a tail piece 288 cut out to embrace one of the shafts 268 or 269, as the case may be, and each tail piece carries a cam follower 289 held against a cam 290 by springs 291 (Fig. 26). The cams 290 are fixed on the shafts 268 and 269 and are shaped to so operate the two registering devices that each time the turrets are rotated, these two registering devices will move into engagement with two stops 284 of the two turrets and thus properly register the plungers for the operations described. The cams 290 retract the registering devices prior to each rotative step of the turrets.

In the first machine of Figures 1–25, the operating rods of the several die operating toggles are provided with feet, operated by the slides 25 and 26 to respectively preliminarily close and open the dies. In the second machine of Figures 26–35, the toggle operating rods are operated to quickly open the dies by a slide but the dies are preliminarily closed by the springs 209 on their operating rods, which thereafter become responsive to the operations of the internal cam to apply the forming pressures to the spoon blanks.

It has been already pointed out that each toggle operating rod 205 has affixed thereto a carrier 207 (Fig. 28) which carries the roller 208. This roller functions as a cam follower and is adapted to cooperate with two cams. By reference to Figure 27, it will be noted that one of these cams 292 is an external cam, while the other is an internal cam 293. The external cam 292 is, in effect, a cam plate. It extends through approximately 90° of the rotation of the drum. It is supported for pivotal movement on a stud 294 rigid with the end frame 201. A second stud 295 (Figs. 26, 27), also carried by the same end frame, supports an adjusting plate 296, slotted at 297. The left hand end of the cam plate 292 in Figure 27 is in face abutting relation with the adjusting plate 296 and a locking screw 298 extends through the slot 297 to permit of adjustment of the cam plate 292 about its center of pivotal movement 294. By this adjustment the inclined surface 299 of the cam plate may be regulated so as to lead the cam followers 208 in the most efficient manner into cooperative relation with the internal cam 293. This internal cam is supported from the cam plate 292 by straps 300 and also by an additional support 301, carried by the end frame 201.

It is desirable that the dies be opened to an optimum degree to receive the blanks as they are fed thereto from the feeding stations, and in this machine this degree of opening is regulated by an adjustable plate 302, supported on the cam plate 292, as shown in Figure 27. This plate is positioned to engage with the rollers 208 of the toggle operating rods, while the dies corresponding to these particular rollers are at rest at the feeding stations, so that by vertically regulating the plate 302, the optimum degree of die opening can be conveniently assured.

The machine is so timed that after blanks are introduced, the drum is rotated to bring the next die couple into cooperative relation with the feeding stations, while the die couple which has just been fed moves forward to bring the rollers 208 into cooperative relation with the internal cam 293; but in the interim the springs 209 on the toggle operating rods thereof will hold the dies closed with sufficient pressure on the blanks to keep them in place until the toggles become responsive to the internal cam 293. After this takes place, said internal cam assumes full control of the toggles.

In the first machine the internal cam 41 is of decreasing radius in the direction of travel of the feet 24. In the second machine the internal cam 293 is similarly formed, but is made considerably longer than the corresponding cam in the first machine, so as to impart a more gradual and prolonged closing operation to the dies, through approximately one-half of the rotation of the drum, during which the blanks are formed into spoon shape. By the time the roller followers 208 leave the tail end of the internal cam 293, the toggles are flexed slightly beyond dead centers, as described in connection with the first machine, and they thus remain locked against movement in either direction, while the drum continues to rotate in a step by step manner to bring the thus formed spoons in dry, set condition to the points where they will be picked up by the grippers and removed from the dies. This operation requires the flexing of the toggles in an upward direction and is brought about by the mechanism shown best in Figures 27, 28 and 32.

By reference first to Figure 32, it will be noted that the cam plate 292 carries fixed guides 303 for a vertical slide 304, having a projecting nose 305 let into the inclined surface 299 of the cam plate, so that the upper surface of the slide is normally flush with the inclined surface 299. As the toggles in fully closed position come to the spoon discharging points, the roller of the particular toggle to be operated comes to rest on the upper surface of the slide 304 and said toggle is opened by a raising of this slide. To accomplish this raising movement, the slide has a link connection 306 to one end of a bell crank 307, pivoted on a rigid post 308. The other end of this bell crank carries a follower 309 (Figs. 26, 27) in engagement with a cam track 310 formed in the cam mounted on the upright shaft 269. The timing of the machine is such that, as the drum comes to rest with two finished spoons in a position to be removed by engagement of the grippers which are to remove them, the cam follower 309 will be operated to lift the slide 304, flex the toggles, and open the dies, so that said spoons can be freely lifted out of the dies. After the spoons are removed, the slide again descends and the springs 209 close the dies sufficiently to receive the blanks next to be fed thereto. The normal position of the follower rollers 208 of the toggle operating rod is shown in full lines in Figure 32, the dotted line position showing that into which it is elevated to open the dies for the removal of the spoons. The tail piece 311, shown as secured to the slide 304 and extending upwardly and overlying the roller 208, serves to depress the roller 208 from its dotted lines to its full line position in Figure 32 if dies stick open and the pressure of the spring 209 is insufficient to close them under these conditions.

The operation of the second machine shown in Figures 26–35 may be briefly summarized as follows: The motor 211 operates continuously to rotate the barrel cam 217 and, through this cam, imparts intermittent step by step rotation to the drum 204 to thereby bring the die couples on the drum successively into alinement with the pushers or feeder blades 224 at the feeding station. The two foremost blanks at the feeding station are fed by these pushers during periods of rest of the drum by downward movement of the pushers imparted by the lever 225. As the blanks descend into the die couples, they are moistened with water from spray nozzles (as in Fig. 1), the control valve of which is operated by the lever 245 which is in turn controlled by the cam follower 244 and the cam 243.

While the drum is at rest in alinement with the pushers at the feeding station, the die couples are both partially opened to receive the flat blanks. When they are thrust between the dies, against the power of the springs 209, the dies may yield slightly so as to grip the blanks tightly and hold them in position until they are positively gripped between the dies, due to the closing action of the toggles under the impulse of the cam 293. The engagement of the followers 208 with the cam 293 is accomplished as the drum is subsequently rotated and continues as the drum is intermittently rotated until the followers pass beyond the lower end of the cam 293 as will be apparent from Figure 27. From the time that the blanks are thus gripped and positively operated upon until the time the toggles are finally locked in position, as hereinbefore described with respect to the first machine, the forming of the spoon from the flat blank will be completed, due to the pressure exerted by the dies which are heated, as hereinbefore described.

After the followers 208 leave the cam 293, the dies remain locked in closed position upon the blanks until said dies successively come into alinement with the grippers. By this time said followers will have traversed the incline 299 (Figs. 27 and 32) to such extent as to flex the die operating toggles sufficiently to open the dies so that the finished spoons may be removed. The removal is accomplished by the lowering of the appropriate plungers 252 of the twin turrets, so that the gripping jaws 255 and 256 grip the spoons in the alined die couples and lift them out of the dies. The turrets are rotated as hereinbefore described, so that companion grippers will pick out the finished spoons from the respective die couples as they successively come to the discharge station and, through rotation of the turrets, the spoons carried by the grippers are brought into alinement with discharge chutes 283 at the opposite ends of the machine. Through reciprocation of the grippers these spoons are discharged to said chutes and thus leave the machine.

In the foregoing detailed description, I have set forth two different machines for carrying out the method described and claimed in my aforesaid application. Both of these machines embody certain fundamental characteristics whereby a flat blank of veneer may be manipulated into the shape of the desired end product and set and dried in this shape, without serious breakage of the veneer during the operation of these machines.

These machines illustrate the preferred embodiments of the present invention, but I am aware that structural features thereof may be changed or modified without departing from the invention, which is to be understood as fully commensurate with the appended claims.

The invention has been shown in the form for which it was primarily conceived for the manufacture of wooden spoons, but I wish it understood that it is susceptible, with appropriate changes in design, to feed and manipulate flat blanks for other articles than wooden spoons, e. g., forks, and many other articles which are susceptible to formation, in accordance with this invention, into desired surface configurations for particular uses.

The invention is therefore to be understood as not limited specifically to the details of construction shown in the accompanying drawings, but rather, as fully commensurate with the appended claims.

Having thus fully described the invention, what I claim as new and desire to secure by Letters Patent is:

1. An apparatus of the character described comprising; a drum mounted to rotate, a succession of pairs of die couples arranged in closely spaced apart circumferential relation about the periphery of said drum with the die couples of each pair arranged at substantially the same radial plane of the drum, each die couple embodying two complementary die sections with the outer die sections fixedly mounted with respect to the drum and the inner die sections mounted for movement toward and away from their companion fixed die sections, a toggle connecting the movable die sections of each pair of couples, an operating rod connected to the elbow of each toggle and extending toward the axis of the drum, means for intermittently rotating the drum through increments substantially equal to the spacing of adjacent pairs of die couples about the periphery thereof, a fixed cam along the path of said rods to individually act upon each rod and close the dies thereof as the drum is rotated through less than 360°, means for flexing the toggles to thereafter open the die sections, means for introducing flat blanks into the die sections at a point in advance of die closing, and means for removing die formed blanks from the die sections at a point following die opening.

2. An apparatus of the character described comprising; a drum mounted to rotate, blank feeding stations spaced radially from the drum, a succession of pairs of die couples having movable dies arranged around the periphery of the drum with the movable dies of each pair of couples connected together by a toggle adapted when flexed to open and close the die couples, toggle operating rods bodily movable with the drum and extending toward the axis thereof, means for periodically rotating the drum through angular increments substantially equal to the circumferential spacing of the pairs of die couples thereon to bring said pairs of die couples consecutively in register with the feeding stations with periods of dwell as each pair of die couples register with such stations, means at the feeding stations to introduce blanks therefrom into the die couples of the registering pair, and a stationary cam track along the path of the toggle operating rods and progressively engageable therewith as the drum is rotated, said cam track having a decreasing radius in the direction of rotation of the drum, whereby the die couples are closed by intermittent stages separated by periods of dwell corresponding to the periods of rest of the drum.

3. An apparatus of the character described comprising; a drum mounted to rotate, blank feeding stations spaced radially from the drum, a succession of pairs of die couples having movable dies arranged around the periphery of the drum with the movable dies of each pair of couples connected together by a toggle adapted when flexed to open and close the die couples, toggle operating rods bodily movable with the drum and extending toward the axis thereof, means for periodically rotating the drum through angular increments substantially equal to the circumferential spacing of the pairs of die couples thereon to bring said pairs of die couples consecutively in register with the feeding stations with periods of dwell as each pair of die couples register with such stations, means at the feeding stations to introduce blanks therefrom into the die couples of the registering pair, means operable upon the associated toggle operating rods to preliminarily hold the blanks in the grip of the die couples to which they are fed, a stationary cam track along the path of the toggle operating rods and progressively engageable therewith as the drum is rotated, said cam track having a decreasing radius in the direction of rotation of the drum, whereby the die couples are closed by intermittent stages with interspersed periods of dwell corresponding to the periods of rest of the drum.

4. An apparatus of the character described comprising; a drum mounted to rotate, blank feeding stations spaced radially from the drum, a succession of pairs of die couples having movable dies arranged around the periphery of the drum with the movable dies of each pair of couples connected together by a toggle adapted when flexed to open and close the die couples, toggle operating rods bodily movable with the drum and extending toward the axis thereof, means for periodically rotating the drum through angular increments substantially equal to the circumferential spacing of the pairs of die couples thereon to bring said pairs of die couples consecutively in register with the feeding stations with periods of dwell as each pair of die couples register with such stations, means at the feeding stations to introduce blanks therefrom into the die couples of the registering pair, means operable upon the associated toggle operating rods to thereupon partially close the die couples to which the blanks have been fed, and a stationary cam track along the path of the toggle operating rods and progressively engageable therewith as the drum is rotated, said cam track having a decreasing radius in the direction of rotation of the drum, whereby the die couples are closed by intermittent stages with interspersed periods of dwell corresponding to the periods of rest of the drum.

5. An apparatus of the character described comprising; a drum mounted to rotate, blank feeding stations spaced radially from the drum, a succession of pairs of die couples having movable dies arranged around the periphery of the drum with the movable dies of each couple connected together by a toggle adapted when flexed to open and close the die couples, toggle operating rods extending toward the axis of the drum and movable therewith, means for periodically rotating the drum through angular increments substantially equal to the circumferential spacing of the pairs of die couples thereon to bring said pairs of die couples consecutively in register with the feeding stations with periods of dwell as each pair of die couples register with said station, means at the feeding stations to introduce blanks therefrom into the die couples of the registering pair, a stationary cam track along the path of the toggle operating rods and progressively engageable therewith as the drum is rotated, said cam track having a decreasing radius in the direction of rotation of the drum, whereby the die couples are closed by intermittent stages with interspersed periods of dwell corresponding to the periods of rest of the drum, said cam track terminating after said toggles have been forced beyond dead center sufficiently to lock them against die opening movement, and means positioned further along the circumference of the drum to act upon said toggles for the purpose of flexing them into a position to open the die couples in succession to permit of removal of the formed blanks.

6. An apparatus of the character described comprising; a drum mounted to rotate, blank feeding stations spaced radially from the drum, a succession of pairs of die couples having movable dies arranged around the periphery of the drum with the movable dies of each couple connected together by a toggle adapted when flexed to open and close the die couples, toggle operating rods extending toward the axis of the drum and movable therewith, means for periodically rotating the drum through angular increments substantially equal to the circumferential spacing of the pairs of die couples thereon to bring said pairs of die couples consecutively in register with the feeding stations with periods of dwell as each pair of die couples register with said station, means at the feeding stations to introduce blanks therefrom into the die couples of the registering pair, means operable upon the associated toggle operating rods to thereupon partially close the die couples to which the blanks have been fed, a stationary cam track along the path of the toggle operating rods and progressively engageable therewith as the drum is rotated, said cam track having a decreasing radius in the direction of rotation of the drum, whereby the die couples are closed by intermittent stages with interspersed periods of dwell corresponding to the periods of rest of the drum, said cam track terminating after said toggles have been forced beyond dead center sufficiently to lock them against die opening movement, and means positioned further along the circumference of the drum to act upon said toggles for the purpose of flexing them into a position to open the die couples in succession to permit of removal of the formed blanks.

7. An apparatus of the character described comprising; a drum mounted to rotate, a succession of pairs of die couples arranged in closely spaced apart circumferential relation about the periphery of said drum with the die couples of each pair arranged at substantially the same radial plane of the drum, each die coupling embodying two complementary die sections with the outer die sections fixedly mounted with respect to the drum and with the inner die sections mounted for movement toward and away from the fixed die sections, a toggle connecting the movable die sections of each pair of couples, an operating rod connected to the elbow of each toggle and extending radially toward the axis of the drum, means for intermittently rotating the drum through increments substantially equal to the spacing of adjacent pairs of die couples about the periphery thereof, means for flexing the toggles to close the die couples of the successive pairs in sequence, means for flexing the toggles to thereafter open the die couples, means for introducing flat blanks into the die couples at one location about the periphery of the drum, means for removing die formed blanks from the die couples at another location about the periphery of the drum, means for spraying moisture onto the blanks as they are fed to the die couples, and means for heating the die couples to a sufficient temperature to convert said moisture into steam when said die couples are closed upon said blanks.

8. In an apparatus of the character described; a plurality of die couples mounted for movement along a predetermined path, means for introducing blanks into the die couples in succession at one point in said path, means for thereafter closing the die couples in succession, means at a point further along said path for thereafter opening the die couples in succession to permit of removal of the blanks formed by the closing thereof, a revolving turret having a plurality of gripper plungers mounted to reciprocate toward and away from the die couples and each of which carries a blank gripper, means for rotating said turret to bring the plungers selectively into alinement with the die couples as they come to the removal point of the formed blanks, and means for reciprocating the plungers selectively to cause the grippers thereof to engage and remove the formed blanks from said die couples.

9. In an apparatus of the character described; a drum mounted to rotate, a succession of die couples arranged in closely spaced apart circumferential relation about the periphery of the drum, blank feeding and formed blank removing stations arranged peripherally of the drum, means at the blank feeding stations to feed flat wooden blanks to the die couples as they successively are brought into juxtaposition with the feeding station through rotation of the drum, means for operating the die couples to form the blanks while the die couples containing them are passing from the feeding to the removing stations, a turret mounted to rotate and carrying a succession of reciprocable plungers on each of which is supported a gripper, means to rotate the turret to bring the plungers successively into alined relation with a formed blank in a die couple at the removing station, means for thereupon reciprocating the alined plunger to engage the gripper with such formed blank and remove it from the die couple, and means for thereafter releasing said formed blank from said gripper.

10. In an apparatus of the character described; a die couple, means for opening and closing said die couple, means for feeding a blank to the couple when the latter is open, whereby the blank may be formed when the couple is thereafter closed, and formed blank removing means comprising spring pressed fingers adapted to frictionally grip the formed blank in the die couple when said fingers are forced into engagement with the formed blank, means for forcing said fingers into engagement with the formed blank and for thereafter retracting the fingers with the formed blank gripped therein, and means in the path of said fingers to thereafter engage with and separate the fingers for the purpose of releasing the thus removed formed blank.

11. In an apparatus of the character described; a die couple, a feeding station with means to support blanks to be individually fed across an intervening space to the die couple, a pusher for individually feeding the blanks from the feeding station edgewise into the die couple, and spring impelled jaws in said intervening space and between which jaws the blanks are fed from the feeding station to the die couple to steady the blanks as they are fed to said couple.

12. In an apparatus of the character described; a die couple, a feeding station with means to support blanks to be individually fed across an intervening space to the die couple, a pusher for individually feeding the blanks from the feeding station edgewise into the die couple, spring impelled jaws in said intervening space and between which jaws the blanks are fed from the feeding station to the die couple to steady the blanks as they are fed to said couple, and means for disengaging said spring impelled jaws from the blank after it has been deposited in the die couple.

13. An apparatus of the character described comprising: a drum mounted to rotate, a succession of die couples spaced around the periphery of the drum, each die couple embodying a pair of fixed die sections arranged in spaced apart relation transversely of the drum and rigid with the drum and a pair of complementary movable die sections mounted on the drum to approach and recede from said fixed die sections, a toggle connecting each pair of movable die sections, a toggle operating rod extending from the elbow of each toggle in an inwardly radial direction into the interior of the drum, and a fixed cam on the interior of the drum and operable upon the toggle operating rods to flex the toggles as the drum is rotated.

14. An apparatus of the character described comprising; a drum mounted to rotate, a succession of pairs of heated die couples arranged in closely spaced apart circumferential relation about the periphery of said drum with the die couples of each pair arranged at substantially the same radial plane of the drum, each die couple embodying two complementary die sections with the outer die sections fixedly mounted with respect to the drum and with the inner die sections mounted for movement toward and away from the fixed die sections, a toggle connecting the movable die sections of each pair of couples, an operating rod connected to the elbow of each toggle and extending radially toward the axis of the drum, means for intermittently rotating the drum through increments substantially equal to the spacing of adjacent pairs of die couples about the periphery thereof, means acting on said rods for flexing the toggles to close the die couples of the successive pairs in sequence, means for flexing the toggles to thereafter open the die couples, means for introducing flat blanks into the die couples at one location about the periphery of the drum, and means for removing die formed blanks from the die couples at another location about the periphery of the drum.

15. In an apparatus of the character described, a feeding station having means for supporting dry blanks, a plurality of die couples mounted to pass said feeding station in spaced relation to the latter, means for intermittently moving said die couples to and from the feeding station with a period of rest as each couple arrives at the feeding station, means for feeding blanks from the feeding station to the die couples during periods of rest of the latter at said station, a water spraying conduit leading from a source of water supply to the space across which the blanks are fed from the feeding station to the die couples, a normally closed valve for controlling the feed of water through said conduit, and means synchronized with the die couple moving means to open said valve while blanks are fed to cause each blank to be sprayed with water from said conduit as it is fed from the feeding station to a die couple.

STEPHEN F. MONTAGUE.

REFERENCES CITED

The following references are of record in the file of this patent:

UNITED STATES PATENTS

| Number | Name | Date |
|---|---|---|
| 171,995 | Comstock | Jan. 11, 1876 |
| 406,225 | Metz | July 2, 1889 |
| 564,203 | Kellogg | July 21, 1896 |
| 710,231 | Aber | Sept. 30, 1902 |
| 750,209 | Magers | Jan. 19, 1904 |
| 781,600 | Hamachek | Jan. 31, 1905 |
| 882,795 | Paul | Mar. 24, 1908 |
| 1,066,684 | Turner | July 8, 1913 |
| 1,108,946 | Thorschmidt | Sept. 1, 1914 |
| 1,372,535 | Mulholland | Mar. 22, 1921 |
| 1,564,848 | Herschede et al. | Dec. 8, 1925 |
| 1,575,909 | Giselson | Mar. 9, 1926 |
| 1,727,513 | Maloon | Sept. 10, 1929 |
| 1,742,135 | Cornell | Dec. 31, 1929 |
| 1,863,251 | Person | June 14, 1932 |
| 2,183,869 | Randall | Dec. 19, 1939 |
| 2,218,023 | Doolittle | Oct. 15, 1940 |
| 2,290,129 | Moreland | July 14, 1942 |
| 2,291,471 | Hopkins | July 28, 1942 |

FOREIGN PATENTS

| Number | Country | Date |
|---|---|---|
| 539,267 | Great Britain | Sept. 3, 1941 |